US008968669B2

(12) United States Patent
Chen

(10) Patent No.: US 8,968,669 B2
(45) Date of Patent: Mar. 3, 2015

(54) MULTI-STAGE SYSTEM FOR PRODUCING A MATERIAL OF A BATTERY CELL

(71) Applicant: Llang-Yuh Chen, Saratoga, CA (US)

(72) Inventor: Llang-Yuh Chen, Saratoga, CA (US)

(*) Notice: Subject to any disclaimer, the term of this patent is extended or adjusted under 35 U.S.C. 154(b) by 142 days.

(21) Appl. No.: 13/901,121

(22) Filed: May 23, 2013

(65) Prior Publication Data
US 2014/0328724 A1 Nov. 6, 2014

Related U.S. Application Data

(60) Provisional application No. 61/855,063, filed on May 6, 2013.

(51) Int. Cl.
B01J 8/18 (2006.01)
B01J 8/24 (2006.01)
C01B 25/45 (2006.01)
C01B 13/14 (2006.01)
B22F 9/08 (2006.01)
B01J 12/02 (2006.01)

(52) U.S. Cl.
CPC ............. C01B 25/45 (2013.01); C01B 13/14 (2013.01); B22F 9/082 (2013.01); B01J 8/18 (2013.01); B01J 8/1827 (2013.01); B01J 8/24 (2013.01); B01J 12/02 (2013.01)
USPC .......................................... 422/187; 422/139

(58) Field of Classification Search
CPC ...................................... B01J 8/18; B01J 8/24
USPC ................................................. 422/139, 187
See application file for complete search history.

(56) References Cited

U.S. PATENT DOCUMENTS

| 5,308,585 | A | 5/1994 | Stroder et al. |
| 5,372,096 | A | 12/1994 | Skowyra et al. |
| 5,406,914 | A | 4/1995 | Hyppanen et al. |
| 5,425,412 | A | 6/1995 | Hyppanen et al. |
| 5,443,809 | A | 8/1995 | Olsen |

(Continued)

FOREIGN PATENT DOCUMENTS

WO  WO-2013052456 A1  4/2013

OTHER PUBLICATIONS

M. Stanley Whittingham et al. Lithium Batteries and Cathode Materials, *Chem. Rev.* Sep. 14, 2004, 4271-4301, vol. 104, American Chemical Society.

(Continued)

Primary Examiner — Walter D Griffin
Assistant Examiner — Huy-Tram Nguyen
(74) Attorney, Agent, or Firm — Ya-Fen Chen

(57) ABSTRACT

A system and method thereof are provided for multi-stage processing of one or more precursor compounds into a battery material. The system includes a mist generator, a drying chamber, one or more gas-solid separators, and one or more in-line reaction modules comprised of one or more gas-solid feeders, one or more gas-solid separators, and one or more reactors. Various gas-solid mixtures are formed within the internal plenums of the drying chamber, the gas-solid feeders, and the reactors. In addition, heated air or gas is served as the energy source within the processing system and as the gas source for forming the gas-solid mixtures to facilitate reaction rate and uniformity of the reactions therein. Precursor compounds are continuously delivered into the processing system and processed in-line through the internal plenums of the drying chamber and the reaction modules into final reaction particles useful as a battery material.

23 Claims, 12 Drawing Sheets

(56) References Cited

U.S. PATENT DOCUMENTS

| | | | |
|---|---|---|---|
| 5,770,018 | A | 6/1998 | Saidi et al. |
| 5,910,382 | A | 6/1999 | Goodenough et al. |
| 5,952,125 | A | 9/1999 | Bi et al. |
| 5,983,840 | A | 11/1999 | Riccius et al. |
| 6,203,944 | B1 | 3/2001 | Turner et al. |
| 6,383,235 | B1 | 5/2002 | Maegawa et al. |
| 6,409,984 | B1 | 6/2002 | Hattori et al. |
| 6,432,583 | B1 | 8/2002 | Fukuda et al. |
| 6,511,516 | B1 | 1/2003 | Johnson et al. |
| 6,582,481 | B1 | 6/2003 | Erbil et al. |
| 6,685,804 | B1 | 2/2004 | Ikeda et al. |
| 6,699,297 | B1 | 3/2004 | Yamawaki et al. |
| 6,699,336 | B2 | 3/2004 | Turner et al. |
| 6,902,745 | B2 | 6/2005 | Lee et al. |
| 6,916,578 | B2 | 7/2005 | Funabiki et al. |
| 6,964,828 | B2 | 11/2005 | Lu et al. |
| 6,974,566 | B2 | 12/2005 | Sabacky et al. |
| 7,008,608 | B2 | 3/2006 | Park et al. |
| 7,211,237 | B2 | 5/2007 | Eberman et |
| 7,241,532 | B2 | 7/2007 | Kikuchi et al. |
| 7,381,496 | B2 | 6/2008 | Onnerud et al. |
| 7,393,476 | B2 | 7/2008 | Shiozaki et al. |
| 7,429,435 | B2 | 9/2008 | Nakane et al. |
| 7,488,465 | B2 | 2/2009 | Eberman et al. |
| 7,629,084 | B2 | 12/2009 | Chang et al. |
| 7,709,150 | B2 | 5/2010 | Nakane et al. |
| 7,713,504 | B2 | 5/2010 | Sabacky et al. |
| 7,713,662 | B2 | 5/2010 | Tabuchi et al. |
| 7,718,319 | B2 | 5/2010 | Manthiram et al. |
| 7,771,877 | B2 | 8/2010 | Paulsen et al. |
| 7,824,802 | B2 | 11/2010 | Zhang et al. |
| 7,858,233 | B2 | 12/2010 | Song et al. |
| 7,998,619 | B2 | 8/2011 | Kikuchi et al. |
| 8,007,941 | B2 | 8/2011 | Kweon et al. |
| 8,012,626 | B2 | 9/2011 | Paulsen et al. |
| 8,034,486 | B2 | 10/2011 | Kweon et al. |
| 8,097,363 | B2 | 1/2012 | Yuasa et al. |
| 8,137,847 | B2 | 3/2012 | Ohzuku et al. |
| 8,153,296 | B2 | 4/2012 | Jiang et al. |
| 8,173,301 | B2 | 5/2012 | Hiratsuka et al. |
| 8,241,541 | B2 | 8/2012 | Vallee et al. |
| 8,241,791 | B2 | 8/2012 | Lu et al. |
| 8,277,683 | B2 | 10/2012 | Deng et al. |
| 8,287,829 | B2 | 10/2012 | Harrison et al. |
| 8,389,160 | B2 | 3/2013 | Venkatachalam et al. |
| 2005/0260496 | A1 | 11/2005 | Ueda et al. |
| 2009/0148764 | A1 | 6/2009 | Kwak et al. |
| 2009/0155590 | A1 | 6/2009 | Kelder et al. |
| 2009/0208402 | A1* | 8/2009 | Rossi ........................ 423/438 |
| 2009/0297947 | A1 | 12/2009 | Deng et al. |
| 2010/0107820 | A1* | 5/2010 | Euston ........................ 75/638 |
| 2010/0126849 | A1 | 5/2010 | Lopatin et al. |
| 2010/0151318 | A1 | 6/2010 | Lopatin et al. |
| 2010/0193365 | A1 | 8/2010 | Lopatin et al. |
| 2010/0216026 | A1 | 8/2010 | Lopatin et al. |
| 2010/0261058 | A1 | 10/2010 | Lopatin et al. |
| 2010/0261071 | A1 | 10/2010 | Lopatin et al. |
| 2010/0283012 | A1 | 11/2010 | Hibst et al. |
| 2011/0037018 | A1 | 2/2011 | Bruce et al. |
| 2011/0045170 | A1 | 2/2011 | Shang et al. |
| 2011/0045206 | A1 | 2/2011 | Shang et al. |
| 2011/0049443 | A1 | 3/2011 | Hibst et al. |
| 2011/0052484 | A1 | 3/2011 | Krampitz et al. |
| 2011/0129732 | A1 | 6/2011 | Bachrach et al. |
| 2011/0171371 | A1 | 7/2011 | Li et al. |
| 2011/0210293 | A1 | 9/2011 | Liang et al. |
| 2011/0217585 | A1 | 9/2011 | Wang et al. |
| 2011/0244277 | A1 | 10/2011 | Gordon, II et al. |
| 2011/0272639 | A1 | 11/2011 | Bramnik et al. |
| 2011/0274850 | A1 | 11/2011 | Yang et al. |
| 2011/0274973 | A1 | 11/2011 | Sheem et al. |
| 2011/0274976 | A1 | 11/2011 | Blomgren et al. |
| 2011/0291043 | A1 | 12/2011 | Wilcox et al. |
| 2011/0305949 | A1 | 12/2011 | Nesper et al. |
| 2012/0052347 | A1 | 3/2012 | Wilson et al. |
| 2012/0082884 | A1 | 4/2012 | Orilall et al. |
| 2012/0168686 | A1 | 7/2012 | Metz et al. |
| 2012/0214047 | A1 | 8/2012 | Kwak et al. |
| 2012/0237823 | A1 | 9/2012 | Lopatin et al. |
| 2012/0280435 | A1 | 11/2012 | Mao et al. |
| 2012/0282522 | A1 | 11/2012 | Axelbaum et al. |
| 2012/0282527 | A1 | 11/2012 | Amine et al. |
| 2012/0288617 | A1 | 11/2012 | Yang et al. |
| 2012/0321815 | A1 | 12/2012 | Song et al. |
| 2012/0321953 | A1 | 12/2012 | Chen et al. |
| 2013/0004657 | A1 | 1/2013 | Xu et al. |
| 2013/0017340 | A1 | 1/2013 | Brown et al. |
| 2013/0214200 | A1 | 8/2013 | Yang et al. |
| 2014/0328729 | A1* | 11/2014 | Chen ........................ 422/187 |

OTHER PUBLICATIONS

Yasuhiro Fujii et al. Structural and electrochemical properties of $LiNi1/3Co1/3Mn1/3O2$: Calcination temperature dependence. *Journal of Power Sources*, Jun. 17, 2007, 894-903. vol. 171, Elsevier B.V.

Marca M. Doeff et al. Olivines and Substituted Layered Materials, ES 052, May 10, 2011, Lawrence Berkeley National Laboratory. http://batt.lbl.gov/battfiles/BattReview2011/es052__doeff__2011_o.pdf.

Xiaofeng Zhang et al. Flame synthesis of 5 V spinel-$LiNi0.5Mn1.5O4$ cathode-materials for lithium-ion rechargeable-batteries. *Proceedings of the Combustion Institute*. 2011, 1867-1874, vol. 33, Elsevier.

Gregory Krumdick et al. Argonne's Advanced Battery Materials Synthesis and Manufacturing R&D Program. Argonne National Laboratory. 1-5. U.S. Department of Energy.

Anthony Burrell et al. Applied Battery Research for Transportation. Materials Research; Modeling, Diagnostics, and Performance Studies; Abuse Diagnostics & Mitigation; and Applied Research Facilities, Argonne National Laboratory, Brookhaven National Laboratory, Idaho National Labortatory, Lawrence Berkeley National Laboratory, Oak Ridge National Laboratory, the National Renewable Energy Laboratory, Sandia National Laboratories, Army Research Laboratory, and the Jet Propulsion Laboratory. 1-194.

Harshad Tataria et al. Advanced Battery Development, Systems Analysis, and Testing, Advanced Battery Development; Advanced Materials and Processing (FY 2008 FOA); Systems Analysis; Battery Testing Activities; Computer Aided Engineering of Batteries; Small Business Innovative Research Projects (SBIR); and International Collaborative Activities. 1-214.

* cited by examiner

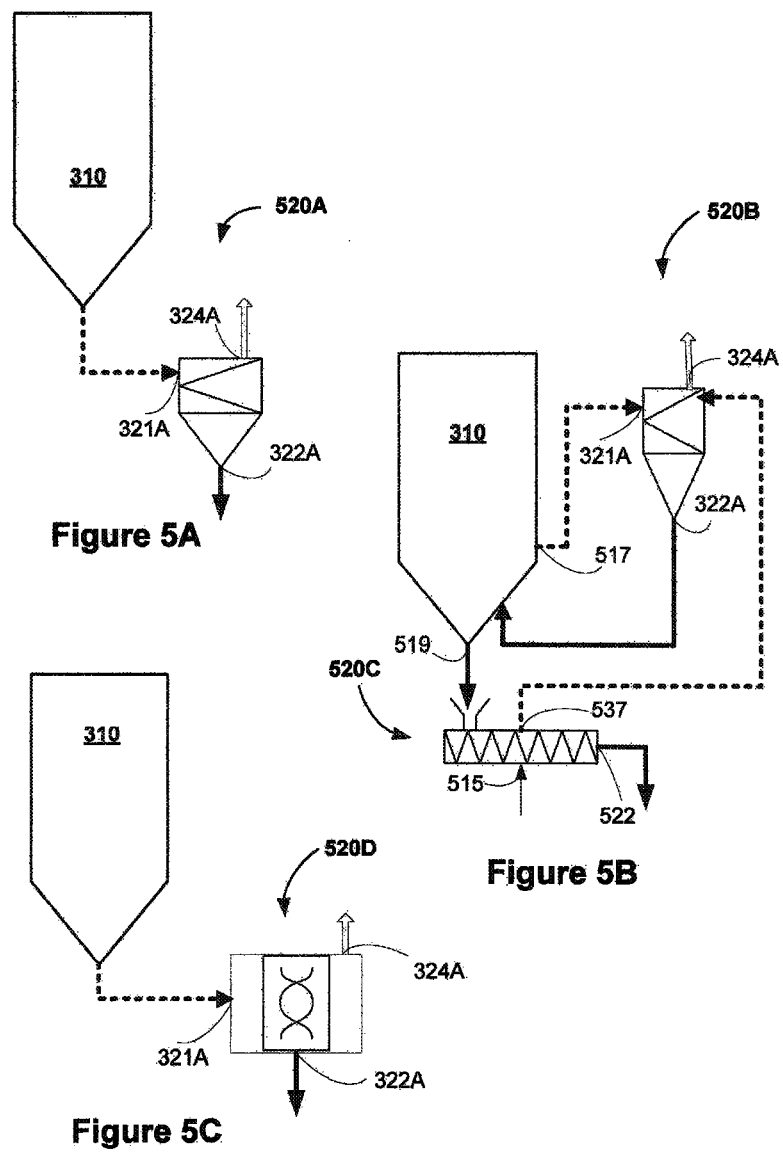

MULTI-STAGE SYSTEM FOR PRODUCING A MATERIAL OF A BATTERY CELL

CROSS-REFERENCE TO RELATED APPLICATIONS

This application claims benefit of U.S. provisional patent application Ser. No. 61/855,063 filed May 6, 2013, which is herein incorporated by reference.

FIELD of THE INVENTION

This invention generally relate to the preparation of materials for battery applications. More specifically the invention related to method and system in manufacturing structured cathode or anode active materials for use in secondary batteries.

BACKGROUND OF THE INVENTION

Great efforts have been devoted to the development of advanced electrochemical battery cells to meet the growing demand of various consumer electronics, electrical vehicles and grid energy storage applications in terms of high energy density, high power performance, high capacity, long cycle life, low cost and excellent safety. In most cases, it is desirable for a battery to be miniaturized, light-weighted and rechargeable (thus reusable) to save space and material resources.

In an electrochemically active battery cell, a cathode and an anode are immersed in an electrolyte and electronically separated by a separator. The separator is typically made of porous polymer membrane materials such that metal ions released from the electrodes into the electrolyte can diffuse through the pores of the separator and migrate between the cathode and the anode during battery charge and discharge. The type of a battery cell is usually named from the metal ions that are transported between its cathode and anode electrodes. Various rechargeable secondary batteries, such as nickel cadmium battery, nickel-metal hydride battery, lead acid battery, lithium ion battery, and lithium ion polymer battery, etc., have been developed commercially over the years. To be used commercially, a rechargeable secondary battery is required to be of high energy density, high power density and safe. However, there is a trade-off between energy density and power density.

Lithium ion battery is a secondary battery which was developed in the early 1990s. As compared to other secondary batteries, it has the advantages of high energy density, long cycle life, no memory effect, low self-discharge rate and environmentally benign. Lithium ion battery rapidly gained acceptance and dominated the commercial secondary battery market. However, the cost for commercially manufacturing various lithium battery materials is considerably higher than other types of secondary batteries.

In a lithium ion battery, the electrolyte mainly consists of lithium salts (e.g., LiPF6, LiBF4 or LiClO4) in an organic solvent (e.g., ethylene carbonate, dimethyl carbonate, and diethyl carbonate) such that lithium ions can move freely therein. In general, aluminum foil (e.g., 15~20 μm in thickness) and copper foil (e.g., 8~15 μm in thickness) are used as the current collectors of the cathode electrode and the anode electrode, respectively. For the anode, micron-sized graphite (having a reversible capacity around 330 mAh/g) is often used as the active material coated on the anode current collector. Graphite materials are often prepared from solid-state processes, such as grinding and pyrolysis at extreme high temperature without oxygen (e.g., graphitization at around 3000° C.). As for the active cathode materials, various solid materials of different crystal structures and capacities have been developed over the years. Examples of good cathode active materials include nanometer- or micron-sized lithium transition metal oxide materials and lithium ion phosphate, etc.

Cathode active materials are the most expensive component in a lithium ion battery and, to a relatively large extent, determines the energy density, cycle life, manufacturing cost and safety of a lithium battery cell. When lithium battery was first commercialized, lithium cobalt oxide ($LiCoO_2$) material is used as the cathode material and it still holds a significant market share in the cathode active material market. However, cobalt is toxic and expensive. Other lithium transition metal oxide materials, such as layered structured $LiMeO_2$ (where the metal Me=Ni, Mn, Co, etc.; e.g., $LiNi_{0.33}Mn_{0.33}Co_{0.33}O_2$, with their reversible/practical capacity at around 140~150 mAh/g), spinel structured $LiMn_2O_4$ (with reversible/practical capacity at around 110~120 mAh/g), and olivine-type lithium metal phosphates (e.g., $LiFePO_4$, with reversible/practical capacity at around 140~150 mAh/g) have recently been developed as active cathode materials. When used as cathode materials, the spinet structured $LiMn_2O_4$ materials exhibit poor battery cycle life and the olivine-type $LiFePO_4$ materials suffer from low energy density and poor low temperature performance. As for $LiMeO_2$ materials, even though their electrochemical performance is better, prior manufacturing processes for $LiMeO_2$ can obtain mostly agglomerates, such that the electrode density for most $LiMeO_2$ materials is lower as compared to $LiCoO_2$. In any case, prior processes for manufacturing materials for battery applications, especially cathode active materials, are too costly as most processes consumes too much time and energy, and still the qualities of prior materials are inconsistent and manufacturing yields are low.

Conventional material manufacturing processes such as solid-state reaction (e.g., mixing solid precursors and then calcination) and wet-chemistry processes (e.g., treating precursors in solution through co-precipitation, sol-gel, or hydrothermal reaction, etc., and then mixing and calcination) have notable challenges in generating nano- and micron-structured materials. It is difficult to consistently produce uniform solid materials (i.e., particles and powders) at desired particle sizes, morphology, crystal structures, particle shape, and even stoichiometry. Most conventional solid-state reactions require long calcination time (e.g., 4-20 hours) and additional annealing process for complete reaction, homogeneity, and grain growth. For example, spinel structured $LiMn_2O_4$ and olivine-type $LiFePO_4$ materials manufactured by solid-state reactions require at least several hours of calcination, plus a separate post-heating annealing process (e.g., for 24 hours), and still showing poor quality consistency. One intrinsic problem with solid-state reaction is the presence of temperature and chemical (such as $O_2$) gradients inside a calcination furnace, which limits the performance, consistency and overall quality of the final products.

On the other hand, wet chemistry processes performed at low temperature usually involve faster chemical reactions, but a separate high temperature calcination process and even additional annealing process are still required afterward. In addition, chemical additives, gelation agents, and surfactants required in a wet chemistry process will add to the material manufacturing cost (in buying additional chemicals and adjusting specific process sequence, rate, pH, and temperature) and may interfere with the final composition of the as-produced active materials (thus often requiring additional steps in removing unwanted chemicals or filtering products).

Moreover, the sizes of the primary particles of the product powders produced by wet chemistry are very small, and tend to agglomerates into undesirable large sized secondary particles, thus affecting energy packing density. Also, morphologies of the as-produced powder particles often exhibit undesirable amorphous aggregates, porous agglomerates, wires, rods, flakes, etc. Uniform particle sizes and shapes allowing for high packing density are desirable.

The synthesis of lithium cobalt oxide ($LiCoO_2$) materials is relatively simple and includes mixing a lithium salt (e.g., lithium hydroxide (LiOH) or lithium carbonate ($Li_2CO_3$)) with cobalt oxide ($Co_3O_4$) of desired particle size and then calcination in a furnace at a very high temperature for a long time (e.g., 20 hours at 900° C.) to make sure that lithium metal is diffused into the crystal structure of cobalt oxide to form proper final product of layered crystal structured $LiCoO_2$ powders. This approach does not work for $LiMeO_2$ since transition metals like Ni, Mn, and Co does not diffuse well into each other to form uniformly mixed transition metal layers if directly mixing and reacting (solid-state calcination) their transition metal oxides or salts. Therefore, conventional $LiMeO_2$ manufacturing processes requires buying or preparing transitional metal hydroxide precursor compounds (e.g., $Me(OH)_2$, Me=Ni, Mn, Co, etc.) from a co-precipitation wet chemistry process prior to making final active cathode materials (e.g., lithium NiMnCo transitional metal oxide ($LiMeO_2$)).

Since the water solubility of these $Ni(OH)_2$, $Co(OH)_2$, and $Mn(OH)_2$ precursor compounds are different and they normally precipitate at different concentrations, the pH of a mixed solution of these precursor compounds has to be controlled and ammonia ($NH_3$) or other additives has to be added slowly and in small aliquots to make sure nickel (Ni), manganese (Mn), and cobalt (Co) can co-precipitate together to form micron-sized nickel-manganese-cobalt hydroxide ($NMC(OH)_2$) secondary particles. Such co-precipitated $NMC(OH)_2$ secondary particles are often agglomerates of nanometer-sized primary particles. Therefore, the final lithium NMC transitional metal oxide ($LiMeO_2$) made from $NMC(OH)_2$ precursor compounds are also agglomerates. These agglomerates are prone to break under high pressure during electrode calendaring step and being coated onto a current collector foil. Thus, when these lithium NMC transitional metal oxide materials are used as cathode active materials, relatively low pressure has to be used in calendaring step, and further limiting the electrode density of a manufactured cathode.

In conventional manufacturing process for $LiMeO_2$ active cathode materials, precursor compounds such as lithium hydroxide (LiOH) and transitional metal hydroxide ($Me(OH)_2$ are mixed uniformly in solid-states and stored in thick $Al_2O_3$ crucibles. Then, the crucibles are placed in a heated furnace with 5-10° C./min temperature ramp up speed until reaching 900° to 950° C. and calcinated for 10 to 20 hours. Since the precursor compounds are heated under high temperature for a long time, the neighboring particles are sintered together, and therefore, a pulverization step is often required after calcination. Thus, particles of unwanted sizes have to be screened out after pulverization, further lowering down the overall yield. The high temperature and long reaction time also lead to vaporization of lithium metals, and typically requiring as great as 10% extra amount of lithium precursor compound being added during calcination to make sure the final product has the correct lithium/transition metal ratio. Overall, the process time for such a multi-step batch manufacturing process will take up to a week so it is very labor intensive and energy consuming. Batch process also increases the chance of introducing impurity with poor run-to-run quality consistency and low overall yield.

Thus, there is a need for an improved process and system to manufacture high quality, structured active materials for a batter cell.

SUMMARY OF THE INVENTION

This invention generally relate to preparing materials for battery applications. More specifically, the invention related to method and system for producing material particles (e.g., active electrode materials, etc) in desirable crystal structures, sizes and morphologies. In one embodiment, a multi-stage inline processing system and method thereof is provided for producing a material of a battery cell. The processing system generally includes one or more processing modules comprised of a mist generator, a drying chamber, one or more gas-solid separators, and one or more in-line reaction modules. The reaction modules include one or more gas-solid feeders and/or one or more reactors, and optionally one or more gas-solid separators. The processing modules and the reaction modules are provided for multi-stage processing of one or more precursor compounds into final reaction product particles. In another embodiment, one or more cooling mechanisms are provided to lower the temperature of final reaction product particles.

Various gas-solid mixtures are formed within the internal plenums of the drying chamber, the one or more gas-solid feeders, and the one or more reactors. In addition, heated air or gas is served as the energy source for reactions inside the drying chamber, the gas-solid feeders, and/or the reactors and as the gas source for forming the gas-solid mixtures to facilitate reaction rate and uniformity of the reactions therein. Solid precursors are continuously delivered into the processing modules and the reaction modules of the processing system and processed, through various plenums of the chambers, feeder reactors, and/or reactors within the processing system into final reaction product particles.

In one embodiment, a method of producing a material (e.g., cathode or anode active materials) for a battery electrochemical cell is provided. The method includes drying a first mixture formed from a mist of a liquid mixture comprising one or more precursors and a flow of a first gas at a first temperature for a first residence time inside a drying chamber, and separating the first mixture into a first type of solid particles and a first side product. Next, the first type of solid particles of one or more precursor compounds are delivered through one or more multi-stage in-line reaction modules for further reaction. Within a first reaction module, a second gas-solid mixture is formed from the first type of solid particles and a flow of a second gas heated to a second temperature and the second gas-solid mixture is separated into a second type of solid particles and a second side product. The second type of solid particles is then delivered into a second reaction module to form a third gas-solid mixture comprising the second type of solid particles and a flow of a third gas heated to a third temperature inside a reactor. Then, the third gas-solid mixture is reacted for a second residence time inside the reactor and a reacted gas-solid mixture is formed. The reacted gas-solid mixture is cooled to obtain final reacted solid particles.

In one aspect, the final reacted solid particles are suitable as an active electrode material to be further processed into an electrode of a battery cell. In another aspect, the reacted gas-solid mixture is separated into a third type of solid particles and a third side product, and the third type of solid particles is further processed into a battery material. In still another aspect, one or more flows of a cooling fluid can be used to cool the temperature of the final reacted solid particles and/or the third type of solid particles. In a further aspect, a flow of a cooling fluid is delivered to be mixed with the final reacted solid particles to form a cooled gas solid-mixture and cool the temperature thereof. The cooled gas-solid mixture is then separated into a cooled final reacted solid particles and a fourth side product.

In another embodiment, a method of producing a material for a battery electrochemical cell includes drying a first mixture formed from a mist of a liquid mixture and a flow of a first gas at a first temperature for a first residence time inside a drying chamber, and separating the first mixture into a first type of solid particles and a first side product. Next, the first type of solid particles is delivered through one or more multi-stage in-line reaction modules of a processing system for further reaction. The method further includes forming a second gas-solid mixture in a first reaction module and forming a third gas-solid module in a second reaction module.

Within the first reaction module, the second gas mixture formed from the first type of solid particles and a flow of a second gas heated to a second temperature is reacted for a second residence time and separated into a second type of solid particles and a second side product. Next, the second type of solid particles is delivered continuously into a second reaction module. Within the second reaction module, the third gas-solid mixture formed from the second type of solid particles and a flow of a third gas heated to a third temperature is reacted inside a reactor for a third residence time. Then, a portion of gas-solid mixtures within the reactor is delivered out of the reactor and separated into a third type of solid particles and a third side product. The method further includes circulating a portion of the third type of solid particles back into the reactor to be reacted for a fourth residence time inside the reactor and forming a reacted gas-solid mixture, and separating the reacted gas-solid mixture into final reacted solid particles and a fourth side product. Optionally, a flow of a cooling fluid is delivered to mix with the final reacted solid particles and form a cooled gas solid-mixture. The cooled gas-solid mixture can then be separated into a cooled final reacted solid particles and a fifth side product.

In still another embodiment, a method of producing a material for a battery electrochemical cell includes drying a first mixture formed from a mist of a liquid mixture and a flow of a first gas inside a drying chamber at a first temperature for a first residence time, separating the first mixture into a first type of solid particles and a first side product, reacting a second mixture formed from the first type of solid particles and a flow of a second gas heated to a second temperature inside a gas-solid feeder for a second residence time, and separating the second mixture into a second type of solid particles and a second side product. Next, the second type of solid particles is delivered to a fluidized bed reactor and mixed with a flow of a third gas that is heated to a third temperature to form a third mixture. The fluidized bed reactor may be a circulating fluidized bed reactor, a bubbling fluidized bed reactor, an annular fluidized bed reactor, a flash fluidized bed reactor, and combinations thereof. Inside the fluidized bed reactor, the third mixture is reacted for a third residence time to form a reacted gas-solid mixture. Then, the reacted gas-solid mixture is delivered out of the fluidized bed reactor. The reacted gas-solid mixture can be further processed and/or cooled to obtain final reacted solid particles. In one aspect, the final reacted solid particles are mixed with a flow of a cooling fluid to form a cooled gas solid-mixture from and cool the temperature of the final reacted solid particles. The cooled gas-solid mixture is then separated into a cooled final reacted solid particles and a third side product.

In a further embodiment, a multi-stage in-line processing system for manufacturing a material of a battery cell is provided. The processing system includes a drying chamber connected to a first gas line and adapted to flow a first gas inside the drying chamber, and a first gas-solid separator connected to the drying chamber, wherein the first gas-solid separator receives a chamber-product from the drying chamber and separates the one or more drying chamber products into a first type of solid particles and a first side product.

The processing system further includes one or more gas-solid feeders, one or more second gas-solid separators, and one or more reactors. The one or more gas-solid feeders are connected to the first gas-solid separator and one or more second gas lines, wherein the one or more gas-solid feeders receive the first type of solid particles from the first gas-solid separator, mix a second gas with the first type of solid particles, and form one or more gas-solid mixtures therein. The one or more second gas-solid separators are connected to the one or more gas-solid feeders, wherein the one or more second gas-solid separators separate the one or more gas-solid mixtures into one or more types of solid particles and one or more side products. The one or more reactors are connected to the one or more second gas-solid separators and a third gas line having a third gas flowed therein, wherein the one or more reactors receive the one or more types of solid particles from the one or more second gas-solid separators and mix the one or more types of solid particles with the third gas into a reaction mixture, wherein a final reaction product is obtained from reaction of the action mixture within the one or more reactors.

In one aspect, the processing system may further include a mist generator connected to the drying chamber and adapted to generate a mist from a liquid mixture of one or more precursors. In another aspect, the processing system uses heated gas being pre-heated to a desired temperature and flowed from one or more gas lines into the processing system as energy source to react various gas-solid mixtures into final reaction products.

In still another aspect, the multi-stage in-line processing system provides a first stage of processing the one or more precursors into the first type of solid particles using the drying chamber and the first gas-solid separator. Next, the multi-stage in-line processing system provides one or more in-line reaction modules to process the first type of solid particles containing the one or more precursors into final reaction products. For example, a first reaction module within the processing system may include one or more gas-solid feeders and one or more second gas-solid separators to process the first type of solid particles into one or more types of solid particles; whereas a second reaction module may include one or more reactors to process the one or more types of solid particles into the final reaction product.

Within the first reaction module, the gas-solid feeders are connected to the first gas-solid separator and one or more second gas lines to receive the first type of solid particles from the first gas-solid separator, mix a second gas with the first type of solid particles, and form one or more gas-solid mixtures therein. The one or more second gas-solid separators are connected to the one or more gas-solid feeders to separate the one or more gas-solid mixtures into one or more types of solid particles and one or more side products. Within the second reaction module, one or more reactors (e.g., a fluidized bed reactor) are used to receive the one or more types of solid particles from the one or more second gas-solid separators and mix the one or more types of solid particles with a third gas into a reaction mixture. A final reaction product is obtained from a reaction of the reaction mixture within the fluidized bed reactor.

In still another embodiment, a processing system of producing material for a battery cell includes a drying chamber, a first gas-solid separator, one or more gas-solid feeders, one or more second gas-solid separators, and a fluidized bed reactor. In one aspect, the processing system further comprises one or more third gas-solid separators connected to the fluidized bed reactor and adapted to separate a portion of a reaction mixture from the fluidized bed reactor into solid particles and deliver a portion of the solid particles back into the fluidized bed reactor for further reaction. In another aspect, the processing system further comprises one or more cooling mechanism adapted to cool a final reaction product obtained from a reaction of the reaction mixture. The one or more cooling mechanisms may be one or more gas-solid separators, gas-solid feeders, heat exchangers, fluidized beds, and combinations thereof.

In still another embodiment, a processing system of producing a material for a battery cell includes a first module comprising a drying chamber and a first gas-solid separator. The drying chamber includes a chamber inlet adapted to deliver a mist of a precursor-containing liquid mixture, and a gas inlet connected to a first gas line and adapted to flow a first gas inside the drying chamber. The first gas-solid separator is connected to the drying chamber to receive a chamber-product from the drying chamber and separate the one chamber-product into a first type of solid particles and a first side product.

The processing system further includes one or more second modules, where each second module includes a first gas-solid feeder and a second gas-solid separator. The first gas-solid feeder may include a feeder inlet connected to the first gas-solid separator and adapted to receive the first type of solid particles from the first gas-solid separator, and a feeder gas inlet connected to a second gas line and adapted to low a second gas to be mixed with the first type of solid particles and form a second gas-solid mixture therein. The second gas-solid separator is connected to the first gas-solid feeder to separate the one or more gas-solid mixtures into a second type of solid particles and a second side product.

The processing system further includes a third module comprising reactor, where a final reaction product is obtained from a reaction of reaction mixtures within the reactor. The reactor may include a reactor inlet and a reactor gas inlet. The reactor inlet is connected to the second gas-solid separator and adapted to receive the second type of solid particles from the second gas-solid separator. The reactor gas inlet is connected to a third, gas line and adapted to flow a third gas to be mixed with the second type of solid particles into reaction mixtures. Optionally, the processing system further includes one or more gas-solid separators and a cooling module comprising one or more cooling mechanisms. At least one of the one or more gas-solid separators may be connected to the reactor and adapted to separate a portion of the reaction mixture into a third type of solid particles and deliver a portion of the third type of solid particles back into the reactor for further reaction.

BRIEF DESCRIPTION OF THE DRAWINGS

So that the manner in, which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5A illustrates one exemplary gas-solid separator useful in an in-line processing system to prepare a material of a battery cell according various embodiments of the invention.

FIG. 5B illustrates another exemplary gas-solid separator useful in an in-line processing system to prepare a material of a battery cell according various embodiments of the invention.

FIG. 5C illustrate still another exemplary gas-solid separator useful in an in-line processing system to prepare a material of a battery cell according various embodiments of the invention.

DETAILED DESCRIPTION

Figure 1A:
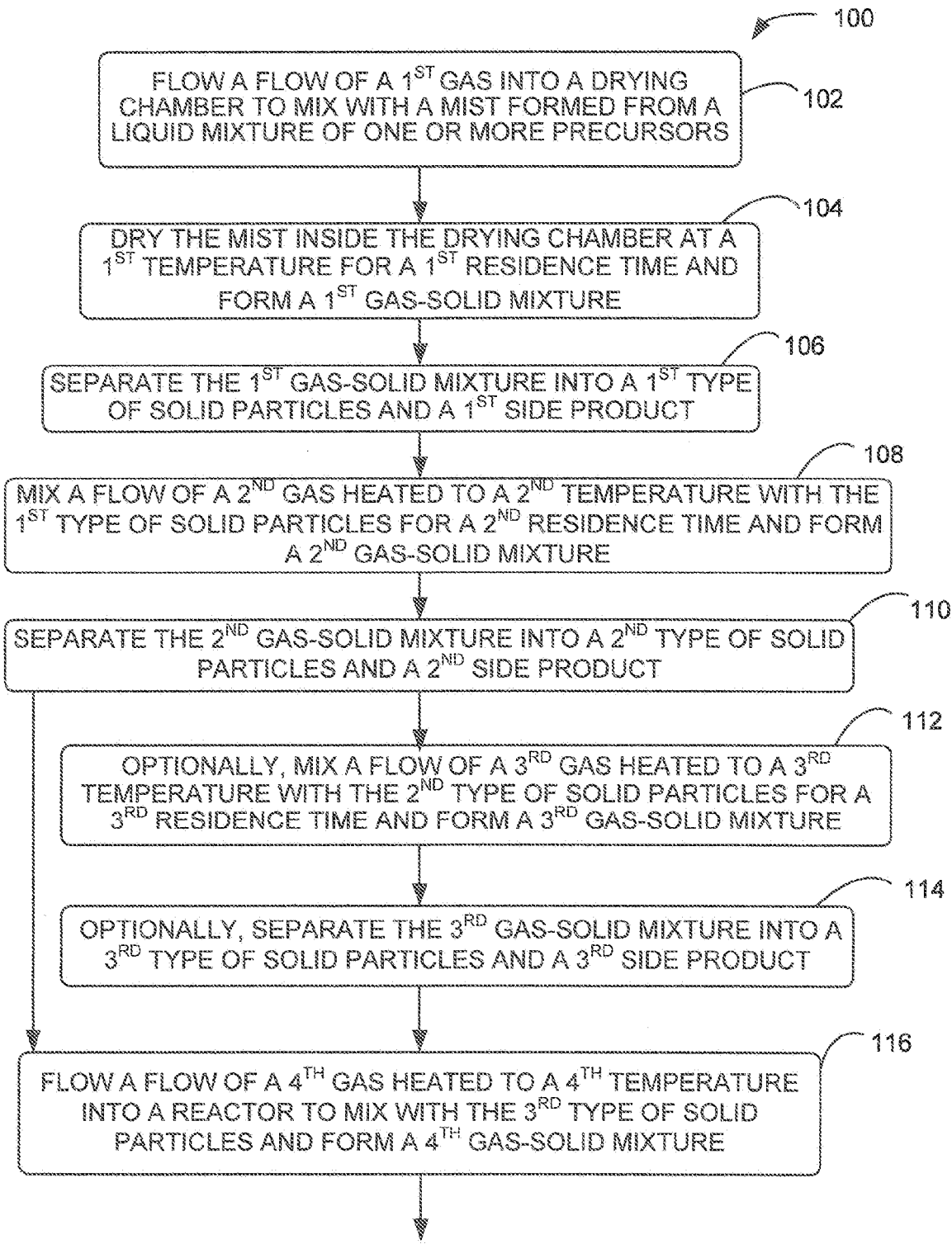
FIG. 1A illustrates one embodiment of a flow chart of a method of producing a material for battery electrochemical cell.

The present invention generally provides a multi-stage in-line processing system and a method thereof for producing a material of a battery cell. The processing system generally includes a first-stage processing module, one or more second-stage reaction modules, a third-stage reaction module, and a fourth-stage cooling module. Solid precursors are continuously delivered into the processing system and processed, through various plenums of the in-line processing and reaction modules, into final reaction particles.

For example, the processing system may include a mist generator, a drying chamber, one or more gas-solid separators, one or more gas-solid feeders, a reactor, and one or more cooling mechanisms. Various gas-solid mixtures are formed within the internal plenums of the drying chamber, the one or more gas-solid feeders, and the reactor. In addition, heated air or gas is served as the energy source for any reactions inside the drying chamber, the gas-solid feeders, and/or the reactor, and as the gas source for forming the gas-solid mixtures to facilitate reaction rates and uniformity of the reactions therein. The processing system is useful in performing a continuous process to manufacture a material for a battery cell, save material manufacturing time and energy, and solve the problems of high manufacturing cost, low yield, poor quality consistency, low electrode density, low energy density as seen in conventional active material manufacturing processes.

In one aspect, one or more precursor compounds, such as one or more metal-containing precursors, are mixed with a liquid solvent to form a liquid mixture to obtain uniform blending of the precursors. In another aspect, the ratio of different metal precursors within the liquid mixture can be adjusted (e.g., in desirable molar ratio that correlated to desired composition of the final reaction products). The liquid mixture is then promptly dried into a first gas-solid mixture, which includes dried solid particles of the precursors evenly distributed in a gas phase. The first gas-solid mixture is then separated by a first gas-solid separator into a first type of solid particles containing the evenly mixed precursors. Next, the first type of solid particles is continuously delivered into one or more in-line reaction modules for further reaction. For example, a first reaction module may be used to process the first type of solid particles into partially-reacted product particles, which are then processed by a second reaction module into final reaction products. The final reaction products are then cooled by a cooling module comprising one or more cooling mechanisms.

In still another aspect, gas-solid mixtures are formed inside the drying chamber and the one or more processing and reaction modules, and are further separated into solid particles to be delivered into the next processing modules. Unwanted waste and side products and reaction by-products are separated and removed during the continuous material manufacturing process to ensure the quality of final product particles. Accordingly, a continuous multi-stage process is performed within the processing system to obtain high quality and consistent active battery materials with much less time, labor, and supervision than materials prepared from conventional manufacturing processes.

Figure 1B:
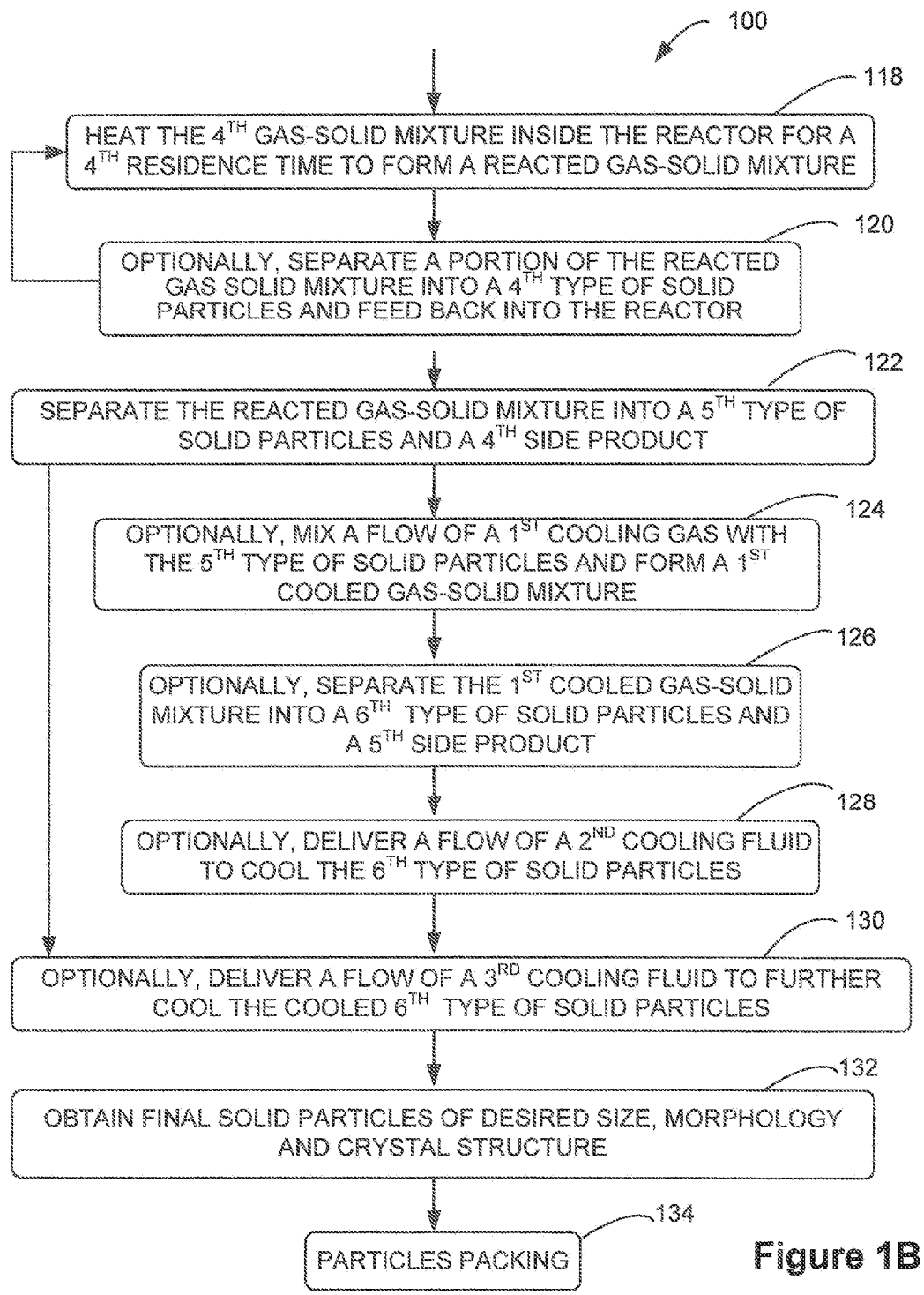
FIG. 1B illustrates a continuation of the flow chart of FIG. 1A.

FIG. 1 illustrates a method 100 of producing a material useful in a battery electrochemical cell. Firstly, at step 102 of the method 100, a flow of a first gas is flowed in to a drying chamber, and a mist is also generated inside the drying chamber. The mist is formed from a liquid mixture comprised of one or more precursors dissolved and/or dispersed in a suitable liquid solvent. Within the drying chamber, the flow of the first gas and the flow of the mist are mixed together.

In general, liquid form of a precursor compound can be prepared directly into a liquid mixture in a desired concentration. Solid form of a precursor compound can be dissolved or dispersed in a suitable solvent (e.g., water, alcohol, isopropanol, or any other organic or inorganic solvents, and their combinations) to form into a liquid mixture of an aqueous solution, slurry, gel, aerosol or any other suitable liquid forms. One or more precursors can be used, depending on the desired composition of a final reaction product. For example, two or more solid precursors can be prepared in desirable molar ratio and mixed into a liquid mixture, such as by measuring and preparing appropriate amounts of the two or more solid precursors into a container with suitable amounts of a solvent. Depending on the solubility of the precursors in a chosen solvent, pH, temperature, and mechanical stirring and mixing can be adjusted to obtain a liquid mixture where one or more precursor compounds at the desirable molar concentrations are fully dissolved and/or evenly dispersed.

In one example, two or more metal-containing precursors are mixed into a liquid mixture for obtaining a final reaction product of a mixed metal oxide material. Exemplary metal-containing precursors include, but are not limited to, metal salts, lithium-containing compound, cobalt-containing compound, manganese-containing compound, nickel-containing compound, lithium sulfate ($Li_2SO_4$), lithium nitrate ($LiNO_3$), lithium carbonate ($Li_2CO_3$), lithium acetate ($LiCH_2COO$), lithium hydroxide (LiOH), lithium formate ($LiCHO_2$), lithium chloride (LiCl), cobalt sulfate ($CoSO_4$), cobalt nitrate ($Co(NO_3)_2$), cobalt carbonate ($CoCO_3$), cobalt acetate ($Co(CH_2COO)_2$), cobalt hydroxide ($Co(OH)_2$), cobalt formate ($Co(CHO_2)_2$), cobalt chloride ($CoCl_2$), manganese sulfate ($MnSO_4$), manganese nitrate ($Mn(NO_3)_2$), manganese carbonate ($MnCO_3$), manganese acetate ($Mn(CH_2COO)_2$), manganese hydroxide ($Mn(OH)_2$), manganese formate ($Mn(CHO_2)_2$), manganese chloride ($MnCl_2$), nickel sulfate ($NiSO_4$), nickel nitrate ($Ni(NO_3)_2$), nickel carbonate ($NiCO_3$), nickel acetate ($Ni(CH_2COO)_2$), nickel hydroxide ($Ni(OH)_2$), nickel formate ($Ni(CHO_2)_2$), nickel chloride ($NiCl_2$), aluminum (Al)-containing compound, titanium (Ti)-containing compound, sodium (Na)-containing compound, potassium (K)-containing compound, rubidium (Rb)-containing compound, vanadium (V)-containing compound, cesium (Cs)-containing compound, chromium (Cr)-containing compound, copper (Cu)-containing compound, magnesium (Mg)-containing compound, iron (Fe)-containing compound, and combinations thereof, among others.

Not wishing to be bound by theory, it is contemplated that, in order to prepare an oxide material with two or more different metals, all of the required metal elements are first mixed in liquid phase (e.g., into a solution, slurry, or gel) using two or more metal-containing precursor compounds as the sources of each metal element such that the two or more different metals can be mixed uniformly at desired ratio. As an example, to prepare a liquid mixture of an aqueous solution, slurry or gel, one or more metal salts with high water solubility can be used. For example, metal nitrate, metal sulfate, metal chloride, metal acetate, and metal formate, etc., can be used. Organic solvents, such as alcohols, isopropanol, etc., can be used to dissolve and/or disperse metal-containing precursors with low water solubility. In some cases, the pH value of the liquid mixture can be adjusted to increase the solubility of the one or more precursor compounds. Optionally, chemical additives, gelation agents, and surfactants, such as ammonia, EDTA, etc., can be added into the liquid mixture to help dissolve or disperse the precursor compounds in a chosen solvent.

The mist of the liquid mixture may be generated by a mist generator, such as a nozzle, a sprayer, an atomizer, or any other mist generators. Most mist generators employ air pressure or other means to covert a liquid mixture into liquid droplets. The mist generator can be coupled to a portion of the drying chamber to generate a mist (e.g., a large collection of small size droplets) of the liquid mixture directly within the drying chamber. As an example, an atomizer can be attached to a portion of the drying chamber to spray or inject the liquid mixture into a mist containing small sized droplets directly inside the drying chamber. In general, a mist generator that generates a mist of mono-sized droplets is desirable. Alternatively, a mist can be generated outside the drying chamber and delivered into the dying chamber.

Desired liquid droplet sizes can be adjusted by adjusting the sizes of liquid delivery/injection channels within the mist generator. Droplet size ranging from a few nanometers to a few hundreds of micrometers can be generated. Suitable droplet sizes can be adjusted according to the choice of the mist generator used, the precursor compounds, the temperature of the drying chamber, the flow rate of the first gas, and the residence time inside the drying chamber. As an example, a mist with liquid droplet sizes between one tenth of a micron and one millimeter is generated inside the drying chamber.

At step 104, the mist of the liquid mixture is dried (e.g., removing its moisture, liquid, etc.) at a drying temperature for a desired first residence time and form into a first gas-solid mixture with the flow of the first gas within the drying chamber. As the removal of the moisture from the mist of the precursor compounds is performed within the drying chamber filled with the first gas, a first gas-solid mixture composing of the heated first gas and the precursor compounds is formed. Accordingly, one embodiment of the invention provides that the first gas flowed within the drying chamber is used as the gas source for forming a first gas-solid mixture within the drying chamber. In another embodiment, the first gas flowed within the drying chamber is heated and the thermal energy of the heated first gas is served as the energy source for carrying out drying reaction, evaporation, dehydration, and/or other reactions inside the drying chamber. The first gas can be heated to a temperature of between 70° C. to 600° C. by passing through a suitable heating mechanism, such as electricity powered heater, fuel-burning heater, etc.

In one configuration, the first gas is pre-heated to a temperature of between 70° C. to 600° C. prior to flowing into the drying chamber. Optionally, drying the mist can be carried out by heating the drying chamber directly, such as heating the chamber body of the drying chamber. For example, the drying chamber can be a wall-heated furnace to maintain the drying temperature within internal plenum of the drying chamber. The advantages of using heated gas are fast heat transfer, high temperature uniformity, and easy to scale up, among others. The drying chambers may be any chambers, furnaces with enclosed chamber body, such as a dome type ceramic drying chamber, a quartz chamber, a tube chamber, etc. Optionally, the chamber body is made of thermal insulation materials (e.g., ceramics, etc.) to prevent heat loss during drying.

The first gas may be, for example, air, oxygen, carbon dioxide, nitrogen gas, hydrogen gas, inert gas, noble gas, and combinations thereof, among others. For example, heated air can be used as an inexpensive gas source and energy source for drying the mist. The choice of the first gas may be a gas that mix well with the mist of the precursors and dry the mist without reacting to the precursors. In some cases, the chemicals in the droplets/mist may react to the first gas and/or to each other to certain extent during drying, depending on the drying temperature and the chemical composition of the precursors. In addition, the residence time of the mist of thoroughly mixed precursor compounds within the drying chamber is adjustable and may be, for example, between one second and one hour, depending on the flow rate of the first gas, and the length and volume of the path that the mist has to flow through within the drying chamber.

The mist of the liquid mixture is being dried within the drying chamber using the heated first gas flowed continuously and/or at adjustable, variable flow rates. At the same time, the dried solid particles of precursors are carried by the first gas, as thoroughly-mixed gas-solid mixture, through a path within the drying chamber, and as more first gas is flowed in, the gas-solid mixture is delivered out of the drying chamber and continuously delivered to a first gas-solid separator connected to the drying chamber.

Not wishing to be bound by theory, in the method 100 of manufacturing a battery material using one or more precursor compounds, it is contemplated that the one or more precursor compounds are prepared into a liquid mixture and then converted into droplets, each droplet will have the one or more precursors uniformly distributed. Then, the moisture of the liquid mixture is removed by passing the droplets through the drying chamber and the flow of the first gas is used to carry the mist within the drying chamber for a suitable residence time. It is further contemplated that the concentrations of the precursor compounds in a liquid mixture and the droplet sizes of the mist of the liquid mixture can be adjusted to control the chemical composition, particle sizes, and size distribution of final reaction product particles of the battery material.

Next, at step 106, the first gas-solid mixture comprising of the first gas and the precursors mixed together are separated into a first type of solid particles and a first side product using, for example, a first gas-solid separator. The first type of the solid particles may include thoroughly-mixed solid particles of the precursors. Accordingly, a first stage of the method 100 of preparing a battery material include obtaining a first type of solid particles from a first gas-solid mixture comprised of a first gas and one or more precursor compounds.

In the method 100 of preparing a final material product in multiple stages, it is contemplated to perform one or more reactions of the precursor compounds in a first drying stage, two or more reaction stages, one or more cooling stages, etc., in order to obtain final reaction products in desired size, morphology, and crystal structure, which are ready for further battery applications. Not wishing to be bound by theory, it is designed to perform the reaction of the precursors in two or more reaction stages to allow sufficient time and contact of the precursor compounds to each other, encourage nucleation of proper crystal structure and proper folding of particle morphology, incur lower-thermodynamic energy partial reaction pathways, ensure thorough reactions of all precursor compounds, and finalize complete reactions, among others.

The first type of solid particles comprising the precursor compounds are then processed in two or more processing stages (e.g., a second processing stage and a third processing stage) using at least a first reaction module designed for initiating reactions, and a second reaction module designed for completing reactions and obtaining final reaction products. Additional reaction modules can also be used, in one embodiment, the first reaction module includes one or more gas-solid feeders for processing the first type of solid particles into one or more types of solid particles, where a portion of them are partially reacted (some complete reactions may occur). The second reaction module includes one or more reactors for processing the one or more types of solid particles into final reaction products to ensure complete reactions of all the reaction products.

Accordingly, the method 100 may include a first processing stage of drying a mist of a liquid mixture and obtaining a first type of precursor-containing solid particles using a processing module comprised of a drying chamber and a first gas-solid separator. The method 100 may further include a second processing stage of reacting the first type of solid particles using a reaction module comprised of one or more gas-solid feeders and one or more gas-solid separators.

At step 108, a flow of a second gas is delivered to the first type of solid particles once the first type of solid particles is separated from the first side product. For example, a first gas-solid feeder can be used to mix the second gas with the first type of solid particles collected from the first gas-solid separator and form a second gas-solid mixture inside the first gas-solid feeder. In one embodiment, the second gas is heated to a second temperature, which may be a desired reaction temperature, such as a temperature of between 400° C. to 1300° C. and flowed into the first gas-solid feeder to serve as the energy source for initiating one or more reactions to the precursor-containing first type of solid particles. In another embodiment, the second temperature within the first gas-solid feeder a temperature higher than the first temperature used within the drying chamber.

A Gas-solid feeder is used as a quick and easy in-line delivery mechanism to mix solids with gases and without the drawback of using a chamber reactor (e.g., a furnace), which often requires periodic maintenance and repair. Exemplary gas-solid feeders include, but are not limited to, a venture feeder, a rotary feeder, a screw feeder, a table feeder, a belt feeder a vibrating feeder, a tube feeder, and combinations thereof, among others.

At step 110, the second gas-solid mixture reacted at the second temperature is then separated into a second type of solid particles and a second side product using, for example, a second gas-solid separator. The second type of the solid particles may be contain a solid particle mixture comprising of unreacted, partially reacted, and/or compete reacted particles of the precursors. The second side product may include unwanted solvent molecules, reaction by-products, and/or waste gases.

Optionally, the second processing stage of performing par is reactions of the precursor compounds may be conducted in series and/or in-line consecutively to obtain additional types of solid particles using additional reaction modules comprised of at least one gas-solid feeder and at least one gas-solid separator. For example, at step 112, the second type of solid particles may be delivered into, for example, a second gas-solid feeder, and a flow of a third gas may be flowed into the second gas-solid feeder to mix with the second type of solid particles and form a third gas-solid mixture. The flow of the third gas may be heated to a third temperature of between 400° C. to 1300° C., and to serve as the energy source to the third gas-solid mixture for one or more reactions. In one embodiment, the third temperature within the second gas-solid feeder is a temperature higher the second temperature used within the first gas-solid feeder. At step 114, the third gas-solid mixture reacted at the third temperature is then separated into a third type of solid particles and a third side product using, for example, a third gas-solid separator.

The gas-solid mixtures within the first and the second gas-solid feeder may undergo one or more partial or complete reactions. Exemplary reactions of the various type of solid particles within the gas-solid feeders may include, any of oxidation, reduction, decomposition, combination reaction, phase-transformation, re-crystallization, single displacement reaction, double displacement reaction, combustion, isomerization, and combinations thereof, among others. For example, the second and third gas-solid mixture may be partially or completely oxidized, such as oxidizing the precursor compounds into an oxide material.

Exemplary second and third gases include, but are not limited to, air, oxygen, carbon dioxide, an oxidizing gas, hydrogen gas, a reducing agent, nitrogen gas, inert gas, noble gas, and combinations thereof, among others. For an oxidation reaction, an oxidizing gas, such as air, oxygen, etc., can be used. For a reduction reaction, a reducing gas, such as hydrogen gas, ammonium, etc., can be used as the second gas. In addition, nitrogen gas or inert gas can be used as carrier gas. As an example, heated air is used as the gas source at steps 108, 112.

It is contemplated to remove unwanted side products at the steps 110, 112, 114, 116 of the second processing stage, such that various types of solid particles can be further processed without interference from the reaction side products. Accordingly, a second stage of the method 100 of preparing a battery material includes obtaining various types of solid particles (e.g., the second type and/or the third type of solid particles, which may be at least partially reacted) and removing unwanted side products.

The method 100 may further include a third processing stage of reacting various type of solid particles into final reaction products using a reaction module comprised of at least one reactor, and optionally one or more gas-solid separators. At step 116, a flow of a fourth gas that is heated to a fourth temperature is flowed inside a reactor. Accordingly, a fourth gas-solid mixture containing the heated fourth gas and various types of solid particles delivered from the second and/or the third gas-solid separators is formed inside the reactor. In one embodiment, the fourth gas is heated to a desired reaction temperature, such as a temperature of between 400° C. to 1300° C., and flowed into the reactor to serve as the energy source for reacting and/or annealing the various types of unreacted, partially and/or completely reacted precursor-containing solid particles. In another embodiment, the fourth temperature within the reactor is a temperature higher than the second or third temperature within the gas-solid feeders.

At step 118, the fourth gas-solid mixture inside the reactor is heated at the fourth temperature and reacted for a second residence time to form a reacted gas-solid mixture. The second residence time may be any residence time to carry out a complete reaction of the fourth gas solid mixture, such as a residence time of between one second and ten hours, or longer. Reactions of the fourth gas-solid mixture within the reactor may include any of oxidation, reduction, decomposition, combination reaction, phase-transformation, re-crystallization, single displacement reaction, double displacement reaction, combustion, isomerization, and combinations thereof, among others. For example, the fourth gas-solid mixture may be oxidized, such as oxidizing and reacting precursor compounds into an oxide material.

Exemplary fourth gas includes, but is not limited to air, oxygen, carbon dioxide, an oxidizing gas, hydrogen gas, nitrogen gas, ammonium, a reducing agent, inert gas, noble gas, and combinations thereof, among others. For an oxidation reaction, an oxidizing gas, such as air, oxygen, etc., can be used. For a reduction reaction, a reducing gas, such as hydrogen gas, ammonium, etc., can be used as the second gas. Other gas such as carbon dioxide, nitrogen gas, or a carrier gas may also be used. As an example, heated air is used as the gas source at steps 116 to obtain final reaction product of an oxide material. As another example, heated nitrogen-containing gas is used as the gas source at steps 116 to obtain final reaction products.

It is contemplated to obtain a reacted gas-solid mixture within the reactor using energy from the fourth gas that is heated to a reaction temperature to fully complete the reaction and obtain desired crystal structure of the solid particles of the final reaction products. The advantages of flowing air or gas already heated are faster heat transfer, uniform temperature distribution (especially at high temper temperature range), and easy to scale up, among others.

At step 120, optionally, a portion of the reacted gas-solid mixture from the reactor are delivered out of the reactor and separated into a fourth type of solid particles and feed back into the reactor to encourage complete reaction of all the compounds inside the reactor and promote uniform particle sizes of final reacted products. The fourth type of solid particles may have a large particle cut-off size, which may represent unreacted or partially reacted solid particles, or agglomerates of reacted particles, among other, and need to be further processed to undergo further reactions, e.g., decomposition, phase-transformation, re-crystallization, displacement reactions, combination reaction, etc.

The method 100 may include a fourth processing stage of cooling the reacted gas-solid mixture and obtaining solid particles of a final reaction product at desired size, morphology, and crystal structure. For example, the temperature of the reaction product may be slowly cooled down to room temperature to avoid interfering or destroying a process of forming into its stable energy state with uniform morphology and desired crystal structure. In another example, the cooling stage may be performed very quickly to quench the reaction product such the crystal structure of the solid particles of the reaction product can be formed at its stable energy state. As another example, a cooling processing stage in a multi-stage continuous process may include a cooling module comprised of one or more cooling mechanisms. Exemplary cooling mechanisms may be, for example, a gas-solid separator, a heat exchanger, a gas-solid feeder, a fluidized bed cooling mechanism, and combinations thereof, among others.

For example, at step 122, the reacted gas-solid mixture can be separated to obtain a fifth type of solid particles and remove a fourth side product. As the side product may include high temperature gas vapor, the separation and removal of the side product help to, cool the temperature of the fifth type of solid particles. Alternatively, the reacted gas-solid mixture can be cooled into final slid particles after the natural evaporation of hot vapor gas, which may take a long time, depending on the reaction temperature inside the reactor and/or the final temperature of the reacted gas-solid mixture. To speed up cooling and encourage continuous processing within the various drying chamber, gas-solid feeders, and reactor of the processing system, it is desirable to cool the fifth type of solid particles using one or more cooling mechanisms.

Optionally, at step 124, the method 100 includes mixing a flow of a first cooling fluid with the fifth type of solid particles to form a first cooled gas-solid mixture and facilitate cooling efficiency. For example, a gas-solid feeder may be used to mix a cooling fluid (e.g., a gas or liquid) with the fifth type of solid particles. It is contemplated that delivering a cooling air or gas having a much lower temperature than the temperature of the solid particles to be cooled and forming a cooled gas-solid mixture may promote faster heat transfer, uniform temperature distribution, and uniform crystal structure of the cooled particles, among others. Next at step 126, the first cooled gas-solid mixture is separated into a sixth type of solid particles and a fifth side product. The cooling module may include additional cooling mechanisms to facilitate faster delivery and cooling of the reacted gas-solid mixture. For example at step 128, a flow of a second cooling gas can be delivered to a cooling mechanism, such as a heat exchanger, a gas-solid feeder, a fluidized bed, etc., to further cool the temperature of the sixth type of solid particles.

Tandem cooling mechanisms can be employed in-line to continuously deliver and cool the solid particles faster. For example, at step 130, the $6^{th}$ type of the solid particles may be delivered into another cooling mechanism, such as a heat exchanger, a fluidized bed, etc., to further lower its temperature. Finally, at step 132, final solid particles of desired size, morphology, and crystal structure are obtained, and packing of the solid particles ready for various battery applications is performed at step 134.

Figure 2A:
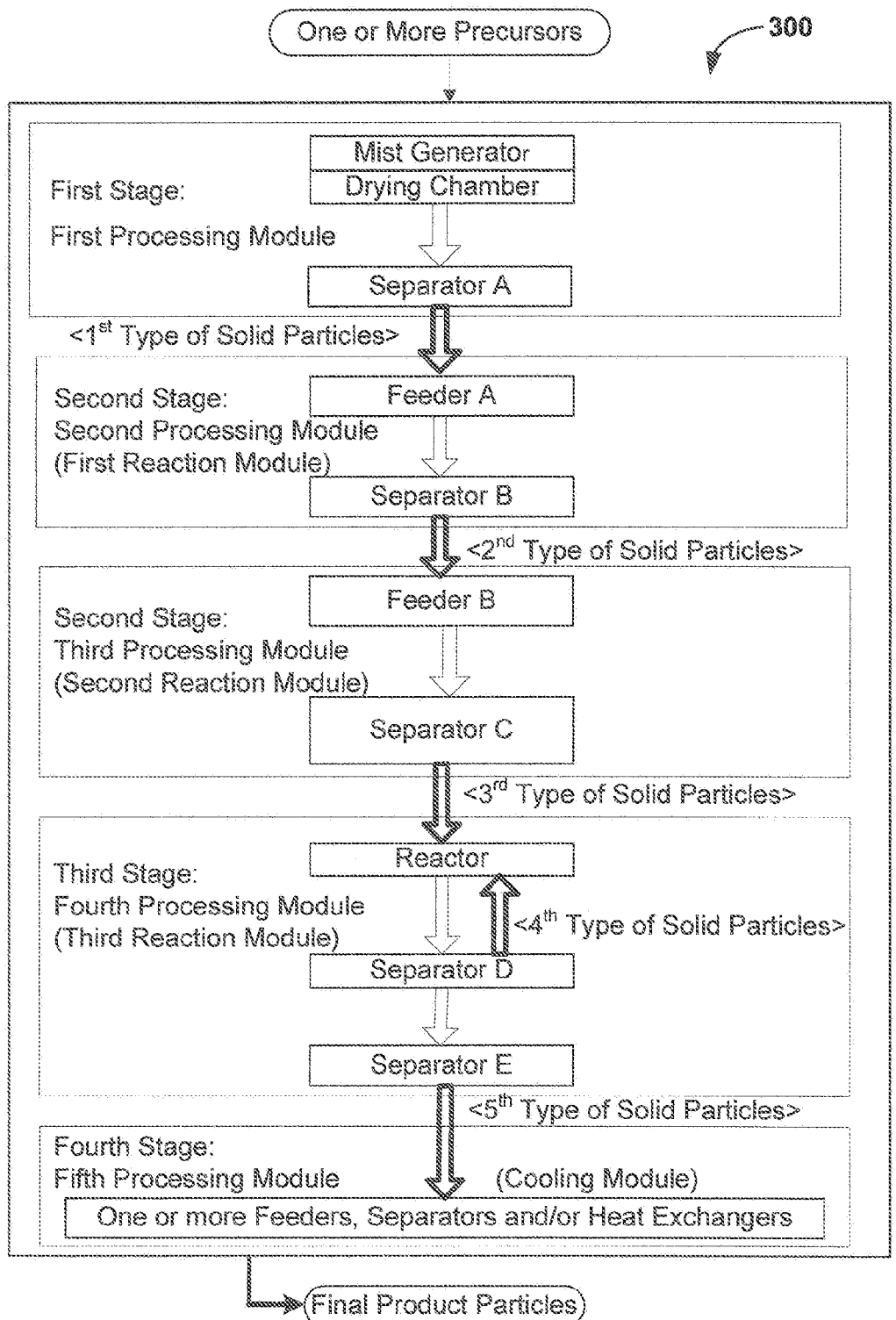
FIG. 2A is a flow chart illustrating one embodiment of employing a processing system in a method of preparing a battery material.

FIG. 2A illustrates one example of a multi-stage in-line processing system, such as a processing system 300, useful in preparing a battery material, according one embodiment of the invention. The processing system 300 generally includes a mist generator, a drying chamber, one or more separators, one or more feeders, and one or more reactors. The processing system 300 can be used in a multi-stage process to prepare final product particles of a battery material from one or more precursors. The multi-stage process may include a first processing stage of drying a mist of a precursor-containing liquid mixture and obtaining a first type of solid particles, a second processing stage of initiating reactions to generate one or more types of solid particles (e.g., a second type of solid particles, and a third type of solid particles), a third processing stage of completing reactions to generate one or more types of reacted solid particles (e.g., a fourth type of solid particles, a fifth type of solid particles, final solid particles, and final reacted solid particles, etc.), and an optional fourth processing stage of cooling reaction products and obtaining final product particles (e.g., a fourth type of solid particles, and a fifth type of solid particles, a sixth type of solid particles, final solid particles, and final reacted solid particles, etc.)

The processing system 300 may include multiple in-line processing modules designed to process the one or more precursors continuously and efficiently and save manufacturing time and cost. For example, processing system 300 may include a first processing module comprised of a mist generator 306, a drying chamber 310, and a gas-solid separator (e.g., a gas-solid separator A in FIGS. 2A-2B, a gas-solid separator 320A in FIGS. 3A-3D, and/or gas-solid separators 520A, 520B, 520C, 520D in FIGS. 5A-5C, a cyclone, etc.)

The processing system 300 may include additional processing modules, such as two or more reaction modules, and an optional cooling module. One or more reaction modules (e.g., a first reaction module and/or a second reaction module, as shown in FIG. 2A) are provided for initiating reactions of the precursors, and at least another reaction module (e.g., a third reaction module, as shown in FIG. 2A) is provided for performing final and complete reactions.

For example, in FIG. 2A, the first reaction module (the second processing module) is comprised of a feeder A (e.g., gas-solid feeder 330A in FIGS. 3A-3D, a venture feeder, a rotary feeder, a screw feeder, a table feeder, a belt feeder, a vibrating feeder, a tube feeder, and/or other types of feeders, etc.) and a separator B (e.g., a gas-solid separator 320B in FIGS. 3A-3D, gas-solid separators 520A, 520B, 520C, 520D in FIGS. 5A-5C, a cyclone, an electrostatic separator, etc.). In addition, the second reaction module (the third processing module) is comprised of a feeder B (e.g., gas-solid feeder 330B in FIG. 3D, a venture feeder, a rotary feeder, a screw feeder, a table feeder, a belt feeder, a vibrating feeder, a tube feeder, and/or other types of feeders, etc.) and a separator C (e.g., a gas-solid separator 320C in FIG. 3D, the gas-solid separators 520A, 520B, 520C, 520D in FIGS. 5A-5C, a cyclone, an electrostatic separator, etc.).

Figure 2B:
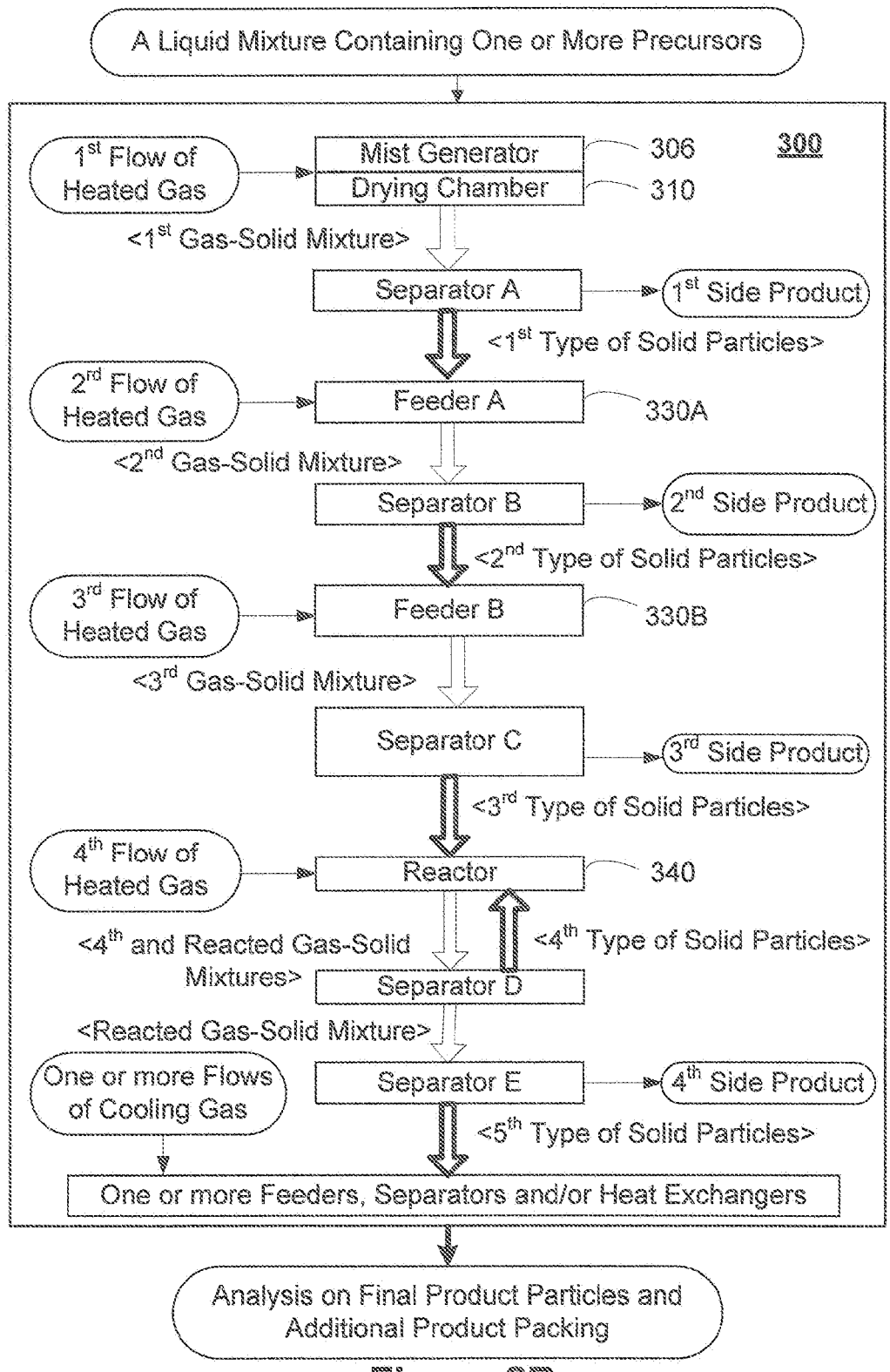
FIG. 2B illustrates a multi-stage in-line processing system useful in preparing a battery material according one embodiment of the invention.

In FIG. 2A, the third reaction module (the fourth processing module) is provided for completing reactions and may be comprised of a reactor (e.g., the reactor 340 in FIGS. 3A-3D, reactors 340A, 340B, 340C, 340D in FIGS. 6A-6D a furnace, a fluidized bed reactor, etc.) and one or more separators (e.g., separator D and separator E in FIGS. 2A-2B, gas-solid separators 320D, 320E in FIGS. 3A-3D, a cyclone, an electrostatic separator, a fluidized bed separator, etc.) Optionally, final reaction products can be cooled by the cooling module (e.g., the fifth processing module in FIG. 2A) within the processing system 300, and the cooling module may include one or more feeders (e.g., a gas-solid feeder 330C in FIG. 3C, a venture feeder, a tube feeder, etc.), one or more separators (e.g., gas-solid separators 320E, 320F in FIGS. 3B-3D, the gas-solid separators 520A, 520B, 520C, 520D in FIGS. 5A-5C, a cyclone, an electrostatic separator, etc.), one or more heat exchangers e.g., heat exchangers 350, 350A, 350B in FIGS. 3A-3D, etc.), one or more fluidized cooling beds, and other cooling mechanisms.

FIG. 2B illustrates a flow chart of, operating the method 100 of preparing a material for a battery electrochemical cell using the processing system 300 fully equipped with all of the required manufacturing tools. First, a liquid mixture containing one or more precursors is prepared and delivered into the mist generator 306 of the processing system 300. The mist generator 306 is coupled to the drying chamber 310 and adapted to generate a mist from the liquid mixture.

Within the first drying stage, a first flow of heated gas (e.g., heated to a drying temperature of between 70° C. and 600° C.) can be flowed into the drying chamber 310 to fill and pre-heat an internal volume/plenum of the drying chamber 310 prior to the formation of the mist or at the same time when the mist is generated inside the drying chamber 310. The mist is mixed with the heated gas and its moisture is removed such that a first gas-solid mixture, which contains the first heated gas, the one or more precursors, and/or other gas-phase waste and side products or by-products, etc., is formed. The use of the heated gas as the energy source to dry the mist provides the benefits of fast heat transfer, precise temperature control, uniform temperature distribution therein, and/or ease to scale up, among others. Next, the first gas-solid mixture is continuously delivered into a separator A (e.g., the gas-solid separator 320A, etc.) to separate the first gas-solid mixture into a first type of solid particles and a first side product. The first side product includes unwanted vapor, unwanted waste products and reaction side products and can be are separated and removed out of the processing system 300.

In a second stage, the first type of solid particles is delivered into the gas-solid feeder 330A to be mixed with a second flow of heated gas (e.g., heated to a temperature of between 400° C. and 1300° C.) and form a second gas-solid mixture. The reaction inside the gas-solid feeder 330A can be carried out for a time period to initiate one or more reactions to the first type of solid particles within the second gas-solid mixture. The use of the heated gas as the energy source to initiate reactions inside the gas-solid feeder 330A provides the benefits of fast heat transfer, precise temperature control, simple design, low cost, and/or uniform temperature distribution, among others.

For example, the second-gas-solid mixture reacted for a time period which is about the time that the second gas-solid mixture is formed and transported through the gas-solid feeder 330A to a gas-solid separator B. The gas-solid separator B separates the second gas-solid mixture into a second type of solid particles and a second side product. The second side product may contain unwanted reaction side products, by-products, and vapors, etc., and can be removed out of the processing system 300. The second type of solid particles may be comprised of a mixture of unreacted, partially reacted, and/or completely reacted compounds.

In a third stage, the second type of solid particles is then delivered into the solid feeder 330B to be mixed with a third flow of heated gas (e.g., heated to a temperature of between 400° C. and 1300° C.) and form a third gas-solid mixture. The reaction inside the gas-solid feeder 330B is carried out for a time period to continue with particle material processing and ensure thoroughly-mixed, efficient thermal reactions and other reactions to occur to the second type of solid particles within the third gas-solid mixture. The use of the heated gas as the energy source inside the gas-solid feeder 330B provides the benefits of fast heat transfer, precise temperature control, simple design, low cost, and/or uniform temperature distribution, among others. The third-gas-solid mixture is reacted for a time period which is about the time that the third gas-solid mixture is formed and transported through the gas-solid feeder 330B to a gas-solid separator C. The gas-solid separator C separates the third gas-solid mixture into a third type of solid particles and a third side product. The third type of solid particles may be comprised of a mixture of unreacted, partially reacted, and/or completely reacted compounds.

In a fourth stage, the third type of solid particles is delivered into the reactor 340 to be mixed with a fourth flow of heated gas (e.g., heated to a temperature of between 400° C. and 1300° C.) and form a fourth gas-solid mixture. The solid particles within the fourth gas-solid mixture may undergo one or more reactions (e.g., oxidization, reduction, decomposition, combination reaction, phase-transformation, re-crystallization, single displacement reaction, double displacement reaction, combustion, isomerization, and combinations thereof) and form reacted gas-solid mixture. The use of the heated gas as the energy source for reactions inside the reactor 340A provides the benefits of fast heat transfer, precise temperature control, simple design, low cost, uniform temperature distribution, and/or easy to scale up, among others. The reaction inside the reactor 340 is carried out for a time period until final reaction products can be obtained. For example, a portion of the gas-solid mixture can be continuously delivered into a gas-solid separator D to obtain a fourth type of solid particles. The fourth type of solid particles may be comprised of a mixture of unreacted, partially reacted, and/or completely reacted compounds, such as large sizes agglomerates, larger sizes particles, amorphous particles, and other reacted particles, etc. At least a portion of the $4^{th}$ type of solid particles separated from the gas-solid separator D is delivered back info the reactor 340 for further reactions until the particles are completely reacted to final desired reaction products. Reacted gas-solid mixture from the reactor 340 can be delivered to a gas-solid separator E to be separated into a fifth type of solid particles, final solid particles, and/or final reacted solid particles.

Optionally, in a fourth stage, the fifth type of solid particles can be delivered into one or more cooling mechanisms (e.g., one or more feeders, separators, and/or heat exchangers, etc.). In addition, one or more flow of cooling fluid (gas or liquid) may be used to cool the temperature of the reaction products. For example, one or more flows of cooling fluid may be delivered to some of the cooling mechanisms to cool the particles in gas phase. The use of the cooling gas to mix with solid particles and cool the solid particles provides the benefits of fast heat transfer, precise temperature control, uniform temperature distribution, and/or easy to scale up, among others. As another example, a cooling fluid (e.g., gas or liquid) can be delivered to a cooling mechanism to lower the temperature of the solid particles without mixing with the solid particles.

The final solid product particles can be, delivered out of the processing system 300 for further analysis on their properties (e.g., specific capacity, power performance, battery charging cycle performance, etc.), particle sizes, morphology, crystal structure, etc., to be used as a material in a battery cell. Finally, the final particles are packed into a component of a battery cell.

Figure 3A:
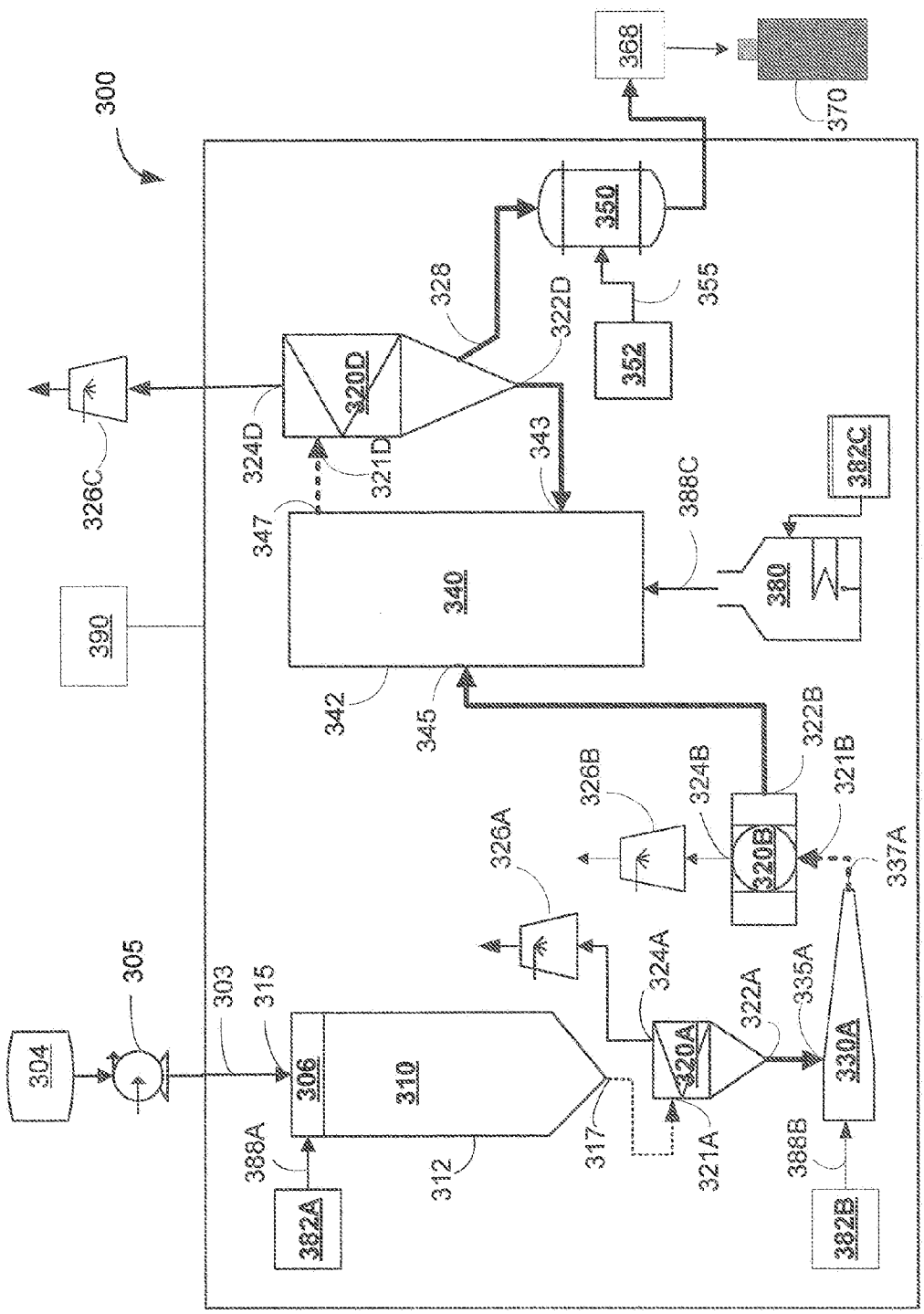
FIG. 3A is a schematic of one embodiment of a processing system useful in preparing a material for a battery electrochemical cell.

FIGS. 3A-3D illustrates examples of the processing system 300, an integrated tool with one or more in-line processing modules to carry out a fast simple, multi-stage, continuous, and low cost manufacturing process for preparing a material useful in various battery applications. In FIG. 3A, the processing system 300 generally includes a first drying module, two reactions modules, and a cooling module. The first drying module may include the mist generator 306, the drying chamber 310, and the gas-solid separator 320A. The first reaction module of the processing system 300 as shown in FIG. 3A may include the gas-solid feeder 330A and the gas-solid separator 320B, and the second reaction module may include the reactor 340 and the gas-solid separator 320D. The processing system 300 may further include a cooling module comprising at least a heat exchanger 350.

In FIG. 3A, the mist generator 306 of the processing system 300 is connected to a liquid mixture container 304, which in turn may be connected to one or more precursor compound sources and solvent sources for mixing them together into a liquid mixture. Desired amounts of precursor compounds (in solid or liquid form) and solvents are dosed, mixed (e.g., by a mixer or other mechanism, not shown), so that the precursor compounds can be dissolved or dispersed in the solvent and mix well into a liquid mixture. If necessary, the liquid mixture is heated to a temperature, such as between 30° C. and 90° C. to help uniformly dissolve, disperse, and mix the precursors. The liquid mixture is then delivered to the liquid mixture container 304. The liquid mixture container 304 is optionally connected to a pump 305, which pumps the liquid mixture from the liquid mixture container 304 into the mist generator 306 of the processing system 300 to generate a mist.

The mist generator 306 converts the liquid mixture into a mist with desired droplet size and size distribution. In addition, the mist generator 306 is coupled to the drying chamber 310 in order to dry and remove moisture from the mist and obtain thoroughly-mixed solid precursor particles. In one embodiment, the mist generator 306 is positioned near the top of the drying chamber 310 that is positioned vertically (e.g., a dome-type drying chamber, etc.) to inject the mist into the drying chamber 310 and pass through the drying chamber vertically downward. Alternatively, the mist generator can be positioned near the bottom of the drying chamber 310 that is vertically positioned to inject the mist upward into the drying chamber to increase the residence time of the mist generated therein. In another embodiment, when the drying chamber 310 is positioned horizontally (e.g., a tube drying chamber, etc.) and the mist generator 306 is positioned near one end of the drying chamber 310 such that a flow of the mist, being delivered from the one end through another end of the drying chamber 310, can pass through a path within the drying chamber 310 for the length of its residence time.

The drying chamber 310 generally includes a chamber inlet 315, a chamber body 312, and a chamber outlet 317. In one configuration, the mist generator 306 is positioned inside the drying chamber 310 near the chamber inlet 315 and connected to a liquid line 303 adapted to flow the liquid mixture therein from the liquid mixture container 304. For example, the liquid mixture within the liquid mixture container 304 can be pumped by the pump 305 through the liquid line 303 connected to the chamber inlet 315 into the internal plenum of the drying chamber 310. Pumping of the liquid mixture by the pump 305 can be configured, for example, continuously at a desired delivery rate (e.g., adjusted by a metered valve or other means) to achieve good process-throughput within the processing system 300. In another configuration, the mist generator 306 is positioned outside the drying chamber 310 and the mist generated therefrom is delivered to the drying chamber 310 via the chamber inlet 315.

One or more gas lines (e.g., a gas line 388A) can be coupled to various portions of the drying chamber 310 and adapted to flow a first gas from a gas source 382A into the drying chamber 310. A flow of the first gas stored in the gas source 382A can be delivered, concurrently with the formation of the mist inside the drying chamber 310, into the drying chamber 310 to carry the mist through the drying chamber 310, remove moisture from the mist, and form a gas-solid mixture with the precursors. Also, the flow of the first gas can be delivered into the drying chamber 310 prior to the formation of the mist to fill and preheat an internal plenum of the drying chamber 310 prior to generating the mist inside the drying chamber 310.

In one example, the gas line 388A is connected to the top portion of the drying chamber 310 to deliver the first gas into the mist generator 306 positioned near the chamber inlet 315 to be mixed with the mist generated by the mist generator 306 inside the drying chamber 310. In one embodiment, the first gas is preheated to a temperature of between 70° C. and 600° C. to mix with the mist and remove moisture from the mist. As another example, the gas line 388A delivering the first gas therein is connected to the chamber inlet 315 of the drying chamber 310, in close proximity with the liquid line 303 having the liquid mixture therein. In another example, the gas line 388A is connected to the chamber body 312 of the drying chamber 310 to deliver the first gas therein and mix the first gas with the mist generated from the mist generator 306. In addition, the gas line 388A (e.g., a branch of the gas line 388A) and/or another gas line may also connected to the drying chamber 310 near the chamber outlet 317 to ensure the gas-solid mixture formed within the drying chamber 310 is uniformly mixed with the first gas throughout the internal plenum of the drying chamber 310. Accordingly, the first gas can thoroughly mix with the mist of the liquid mixture inside the drying chamber 310.

The flow of the first gas may be pumped through an air filter to remove any particles, droplets, or contaminants, and the flow rate of the first gas can be adjusted by a valve or other means. In one embodiment, the first gas is heated to a drying temperature to mix with the mist and remove moisture from the mist. It is designed to obtain spherical solid particles from a thoroughly-mixed liquid mixture of one or more precursors after drying the mist of the liquid mixture. In contrast, conventional solid-state manufacturing processes involve mixing or milling a solid mixture of precursor compounds, resulting in uneven mixing of precursors.

Figure 7A:
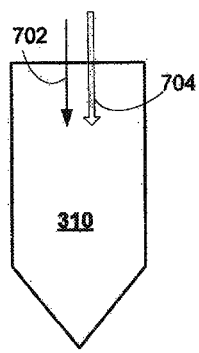
FIGS. 7A-7F show a schematics of a drying chamber with exemplary gas flows and mist flows therein according to various embodiments of the invention.
Figure 7B:
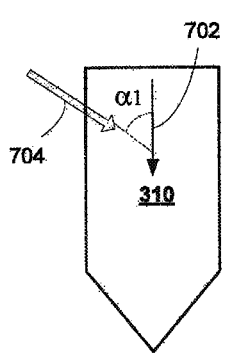
Figure 7C:
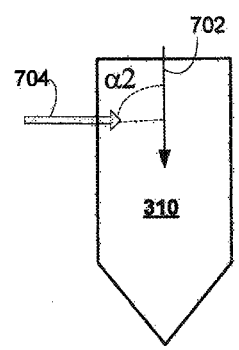
Figure 7D:
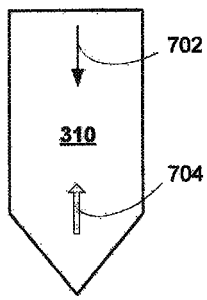
Figure 7E:
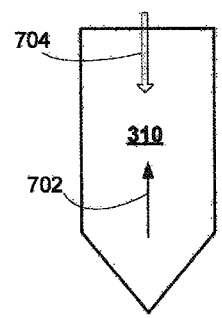
Figure 7F:
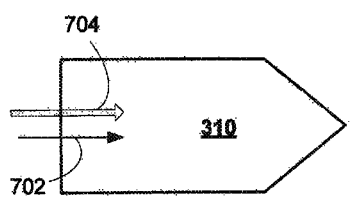

FIGS. 7A-F show examples of the drying chamber 310 which may be configured in the processing system 300 according to various embodiments of the invention, inside the drying chamber 310, there are at least a mist flow 702 and at least a first gas flow 704 flowing and passing through therein. In one embodiment, the flows of the mist of the liquid mixture (e.g., the mist flow 702) and the flows of the first gas (e.g., the first gas flow 704) may encounter with each other inside the drying chamber at an angle of 0 degree to 180 degrees. In addition, the air streams of the mist flow 702 and the first gas flow 704 may be flown in straight lines, spiral, intertwined, and/or in other manners. For example, the flow of the first gas and the flow of the mist flowing inside the drying chamber 310 can be configured to flow as co-currents, as shown in the examples of FIGS. 7A-7C and 7F. Advantages of co-current flows are shorter residence time, lower particle drying temperature, and higher particle separation efficiency, among others. As another example, the flow of the first gas and the flow of the mist flowing inside the drying chamber can be configured to flow as counter currents, as shown in the examples of FIG. 7D-7E. Advantage of counter currents are longer residence time and higher particle drying temperature, among others In the example of FIG. 7A, the mist flow 702 and the first gas flow 704 are configured at an angle of zero (0) degree and can merge into a mixed flow (e.g. co-currents) inside the drying chamber. The first gas flow 704 is flown into a portion of the drying chamber 310 near where the mist flow 702, such that the first gas is in close proximity with the mist to heat and dry the mist. In the example of FIG. 7B, the mist flow 702 and the first gas flow 704 are configured at an a angle of less than 90 degree and can merge into a mixed flow inside the drying chamber 310. In the example of FIG. 7C, the mist flow 702 and the first gas flow 704 are configured at an a angle of 90 degree and can merge into a mixed flow inside the drying chamber 310. In addition, the mist flow 702 and the first gas flow 704 may be flown at various angles directed to each other and/or to the perimeter of the chamber body to promote the formation of spiral, intertwined, and/or other air streams inside the drying chamber 310.

In the example of FIG. 7D, the mist flow 702 and the first gas flow 704 are configured at an $\alpha$ angle of 180 degree and are flown as counter currents. FIG. 7E illustrates one example of the mist generator 306 positioned at the bottom of the drying chamber 310 such that the mist flow 702 and the first gas flow 704 can be configured at an $\alpha$ angle of 180 degree and are flowed as counter currents. In an alternative embodiment, the drying chamber 310 can be positioned horizontally. Similarly, the mist flow 702 and the first gas flow 704 can be configured at an $\alpha$ angle of between 0 degree and 180 degree. In the example of FIG. 7F, the mist flow 702 and the first gas flow 704 are configured at an angle of zero (0) degree and flowed as co-currents to be merge into a mixed flow inside the drying chamber 310 along a horizontal path.

Referring back to FIG. 3A, once the mist of the liquid mixture is dried and a gas-solid mixture with the first gas is formed, the gas-solid mixture is delivered out of the drying chamber 310 via the chamber outlet 317. The drying chamber 310 is coupled to the gas-solid separator 320A of the processing system 300. The gas-solid separator 320A collects products from the drying chamber (e.g., a gas-solid mixture having the first gas and dried particles of the two or more precursors mixed together) from the chamber outlet 317.

The gas-solid separator 320A includes a separator inlet 321A, two or more separator outlets 322A, 324A. The separator inlet 321A is connected to the chamber outlet 317 and adapted to collect the gas-solid mixture and other chamber products from the drying chamber 310. The gas-solid separator 320 separates the gas-solid mixture from the drying chamber 310 into a first type of solid particles and a first side product. The separator outlet 322A is adapted to deliver the first type of solid particles to additional in-line processing modules for initiating reactions and further processing. The separator outlet 324A is adapted to deliver the first side product out of the gas-solid separator 320A. The first side product may be delivered into a gas abatement device 326A to be treated and released out of the processing system 300. The first side product may include, for example, water ($H_2O$) vapor, organic solvent vapor, nitrogen-containing gas, oxygen-containing gas, $O_2$, $O_3$, nitrogen gas ($N_2$), NO, $NO_2$, $NO_2$, $N_2O$, $N_4O$, $NO_3$, $N_2O_3$, $N_2O_4$, $N_2O_5$, $N(NO_2)_3$, carbon-containing gas, carbon dioxide ($CO_2$), CO, hydrogen-containing gas, $H_2$, chlorine-containing gas, $Cl_2$, sulfur-containing gas, $SO_2$, small particles of the first type of solid particles, small particles of the second type of solid particles, and combinations thereof.

Suitable gas-solid separators include cyclones, electrostatic separator electrostatic precipitators, gravity separators, inertia separators, membrane separators, fluidized beds, classifiers, electric sieves, impactors, particles collectors, leaching separators, elutriators, air classifiers, leaching classifiers, and combinations thereof, among others. FIGS. 5A-5C show examples of gas-solid separators 520A, 520B, 520C, 520D, being connected to the drying chamber 310 of the process system 300 according various embodiments of the invention.

In the example of FIG. 5A, the gas-solid separator 520A is a cyclone particle collector. The gas-solid separator 520A collects the gas-solid mixture from the drying chamber 310 via the separator inlet 321A and separates the gas-solid mixture, through high speed rotational flow, gravity, and other air flows, within its cylindrical and/or conical body. Air flows in a helical pattern, beginning at the top (wide end) of the gas-solid separator 520A and ending at the bottom (narrow) end before exiting the gas-solid separator 520A in a straight stream through the center of the cyclone and out the top via the separator outlet 324A. Larger (denser) particles in a rotating stream may strike the outside wall of the gas-solid separator 520A and then fall to the bottom of the gas-solid separator 520A to be removed via the separator outlet 322A. In a conical portion of the gas-solid separator gas-solid separator 520A, as the rotating flow moves towards the narrow end of the gas-solid separator 520A, the rotational radius of the flow of the gas-solid mixture is reduced, thus being able to separate smaller and smaller particles. Usually, the geometry, together with air flow rate inside the gas-solid separator 520A defines the particle cut point size of the gas-solid separator 520A.

In the example of FIG. 5B, the gas-solid separator 520B is a cyclone particle collector. The gas-solid separator 520B is optionally used to ensure the gas-solid mixture from the drying chamber 310 is separated into specific particle cut point size, to be circulated back into the drying chamber 310 via the separator outlet 322A. Chamber products from the drying chamber 310 are delivered from a chamber outlet 519 into the gas-solid separator 520C. The gas-solid separator 520C may be, for example, a fluidized bed particle collector, for carrying out drying and/or multiphase chemical reactions. A gas is flowed from a gas line 515 through a distributor plate within the gas-solid separator 520C to distribute and fill the gas-solid separator 520C. The fluid flowed from the gas line 515 is passed, at high enough velocities, through the gas-solid separator 520C full of a granular solid material (e.g., the chamber products, gas-solid mixture, and other particles delivered from the drying chamber 310) to suspend the solid material and cause it to behave as though it were a fluid, a process known as fluidization. Solid particles supported above the distributor plate can mix well and be separated from gas and/or liquid by-products, side products, or waste products, which are delivered out of the gas-solid separator 520C via a gas outlet 537. Solid particles of the two or more precursors that are dried and uniformly mixed together are delivered out of the gas-solid separator 520C via a separator outlet 522.

In the example of FIG. 5C, the gas-solid separator 520D is an electrostatic precipitating (ESP) particle collector. The gas-solid separator 520D collect the gas-solid mixture or chamber products from the drying chamber 310 and removes solid particles from a flowing gas (such as air) using the force of an induced electrostatic charge with minimal impedance for the flow of gases through the device, an ESP particle collector applies energy only to the particles being collected (not to any gases or liquids) and therefore is very efficient in energy consumption. After separation through the gas-solid separator 520D, the first type of solid particles are delivered out via the separator outlet 322A and the first side product is flowed out via the separator outlet 324A.

The first type of solid particles may include at least the particles of the one or more precursors that are dried and uniformly mixed together. It is contemplated to separate the first type of solid particles away from any side products, gaseous by-products or waste products, prior to reacting the two or more precursors in the processing modules (e.g., the gas-solid feeder 330A, the reactor 340, etc.). Accordingly, the drying module of the processing system 300 is designed to mix the two or more precursors uniformly, dry the two or more precursors, separate the dried two or more precursors, and react the two or more precursors into final reaction products in a continuous manner.

Referring back to FIG. 3A, once the first type of solid particles are separated and obtained, it is delivered continuously (e.g., in-line) into the next processing modules, such as the gas-solid feeder 330A and the gas-solid separator 320B of the first reaction module to initiate reactions, and further to the reactor 340 and one or more separators within the second reaction module for further reactions and processing. The gas-solid feeder 330A includes a solid inlet 335A, a gas inlet 388B connected to a gas source 382B, and a gas-solid outlet 337A. The gas-solid feeder 330A is connected to the separator outlet 322A and adapted to receive the first type of solid particles. Optionally, one or more vessel can be configured to store the first type of solid particles prior to adjusting the amounts of the first type of solid particles delivered into the gas-solid feeder 330A. In general, a gas-solid feeder employs a stream of gas to mix with and deliver solid particles or powders to a desired destination. Exemplary gas-solid feeders include a venturi feeder, a rotary feeder, a screw feeder, a table feeder, a belt feeder a vibrating feeder, a tube feeder, and combinations thereof, among others.

It is contemplated to couple the gas inlet 388B of the gas-solid feeder 330A to a heating mechanism to heat a second gas from the gas source 382B to a reaction temperature of between 400° C. and 1300° C. for initiate reactions of the first type of solid particles and deliver the solid particles to a reactor for complete reactions. The heating mechanism can be, for example, an electric heater, a gas-fueled heater, a burner, among other heaters. Additional gas lines can be used to deliver heated air or gas into the gas-solid feeder 330A, if needed. The pre-heated second gas is injected into the gas-solid feeder 330A at an adjustable flow rate to fill the internal plenum of the gas-solid feeder 330A and mix with the first type of solid particles to form a second gas-solid mixture. The internal plenum of the gas-solid feeder 330A can be maintained at an internal temperature, using the thermal energy of the second gas injected within the gas-solid feeder 330A. One or more reactions of the first type of solid particles can be initiated for a time period that the gas-solid mixture of the second gas and the first type of the solid particles are formed, passing through the gas-solid feeder 330A, and into the gas-solid separator 320B. Thermal energy from the pre-heated second gas is used as the energy source for initiating one or more reactions to the second gas-solid mixture formed inside the gas-solid feeder 330A, for a residence time of between 1 second and ten hours, or longer, depending on the reaction temperature and the type of the precursors initially delivered into the processing system 300.

The second gas-sold mixture is then go through one or more reactions, including, but not limited to, oxidation, reduction, decomposition, combination reaction, phase-transformation, re-crystallization, single displacement reaction, double displacement reaction, combustion, isomerization, and combinations thereof. For example, the solid particles within the second gas-solid mixture may be oxidized, such as oxidizing the precursor compounds into an oxide material of the precursors. As another example, the solid particles within second gas-solid mixture may be reduced and transformed into a reduced material of the precursors. Not wishing to be bound by theory, it is contemplated that heated gas injected into the gas-solid feeder 330A at an adjustable flow rate provides much better thermal transfer and energy efficiency, precise temperature control, uniform temperature distribution than conventional heating of a chamber body of a bulky reactor to reach a temperature for initiating reactions.

The second gas-solid mixture is delivered out of the gas-solid feeder 330A via the gas-solid outlet 337A, which is coupled to the gas-solid separator 320B of the first reaction module within the processing system 300. The gas-solid separator 320B includes a separator inlet 321B, two or more separator outlets 322B, 324B. The separator inlet 321B of the gas-solid separator 320B collects products (e.g., a gas-solid mixture having the second gas and solid particles of partially reacted or complete reacted precursors) from the gas-solid outlet 337A of the gas-solid feeder 330A.

The gas-solid separator 320B separates the second gas-solid mixture into a third type of solid particles and a second side product, and may be, for example, cyclone, an electrostatic separators, an electrostatic precipitator, a gravity separator, an inertia separator, a membrane separator, a fluidized bed, a classifier, an electric sieve, an impactor, a particle collector, a leaching separator, an elutriator, an air classifier, a leaching classifier, and combinations thereof, among others. The gas-solid separator 320B connected to the gas-solid feeder 330A may be any of the gas-solid separators 520A, 520B, 520C, 520D, or combinations thereof, as shown in FIGS. 5A-5C, according various embodiments of the invention.

The separator outlet 324B of the gas-solid separator 320B is adapted to deliver the second side product out of the gas-solid separator 320B. The second side product may be delivered into a gas abatement device 326B (or the gas abatement device 326A shared with the gas-solid separator 320A) to be treated and released out of the processing system 300. The second side product may include, for example, water ($H_2O$) vapor, organic solvent vapor, nitrogen-containing gas, oxygen-containing gas, $O_2$, $O_3$, nitrogen gas ($N_2$), NO, $NO_2$, $NO_2$, $N_2O$, $N_4O$, $NO_3$, $N_2O_3$, $N_2O_4$, $N_2O_5$, $N(NO_2)_3$, carbon-containing gas, carbon dioxide ($CO_2$), CO, hydrogen-containing gas, $H_2$, chlorine-containing gas, $Cl_2$, sulfur-containing gas, $SO_2$, small particles of the first type of solid particles, small particles of the second type of solid particles, and combinations thereof.

Figure 3B:
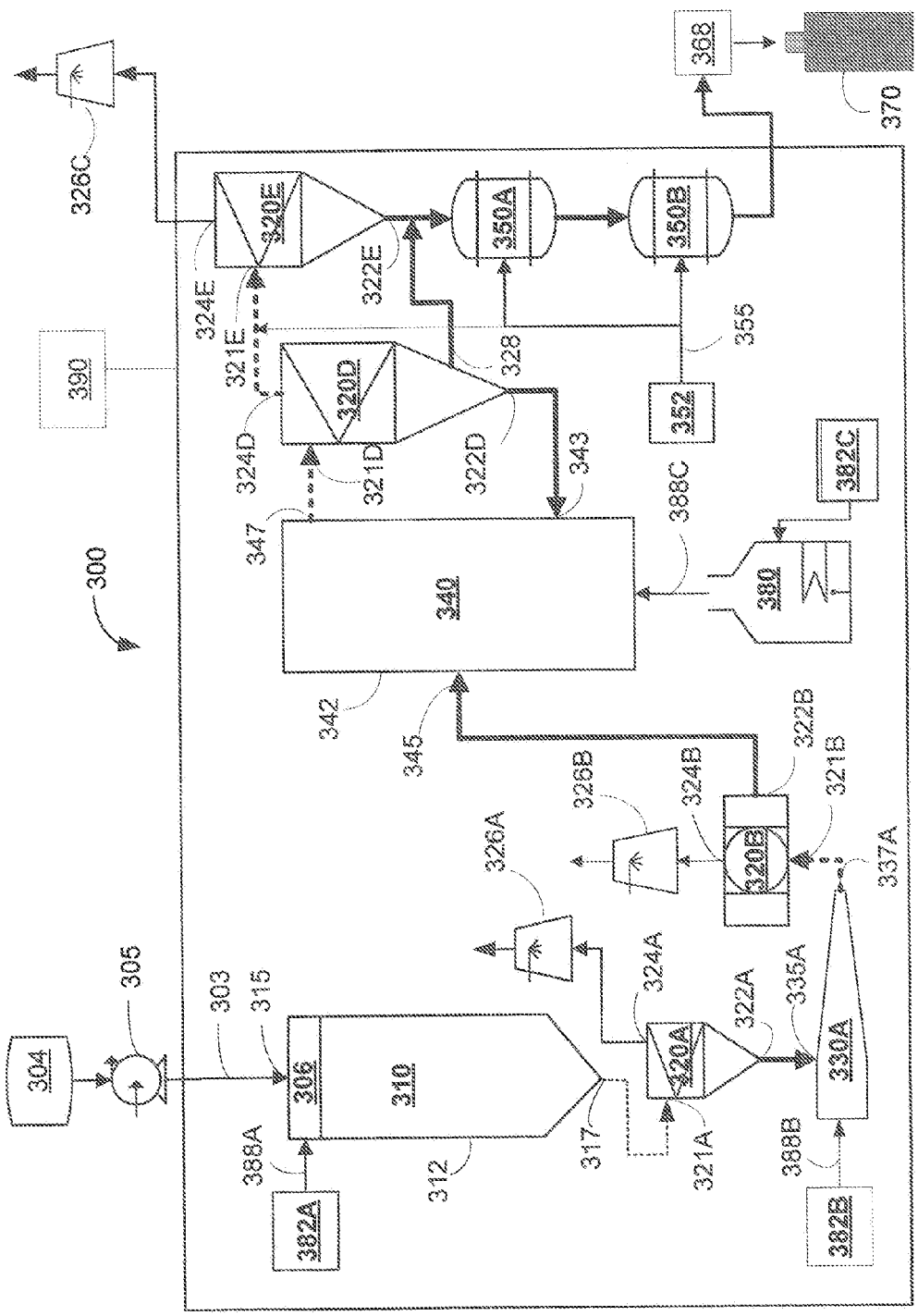
FIG. 3B is a schematic of another embodiment of a processing system useful in preparing a material for a battery electrochemical cell.
Figure 3C:
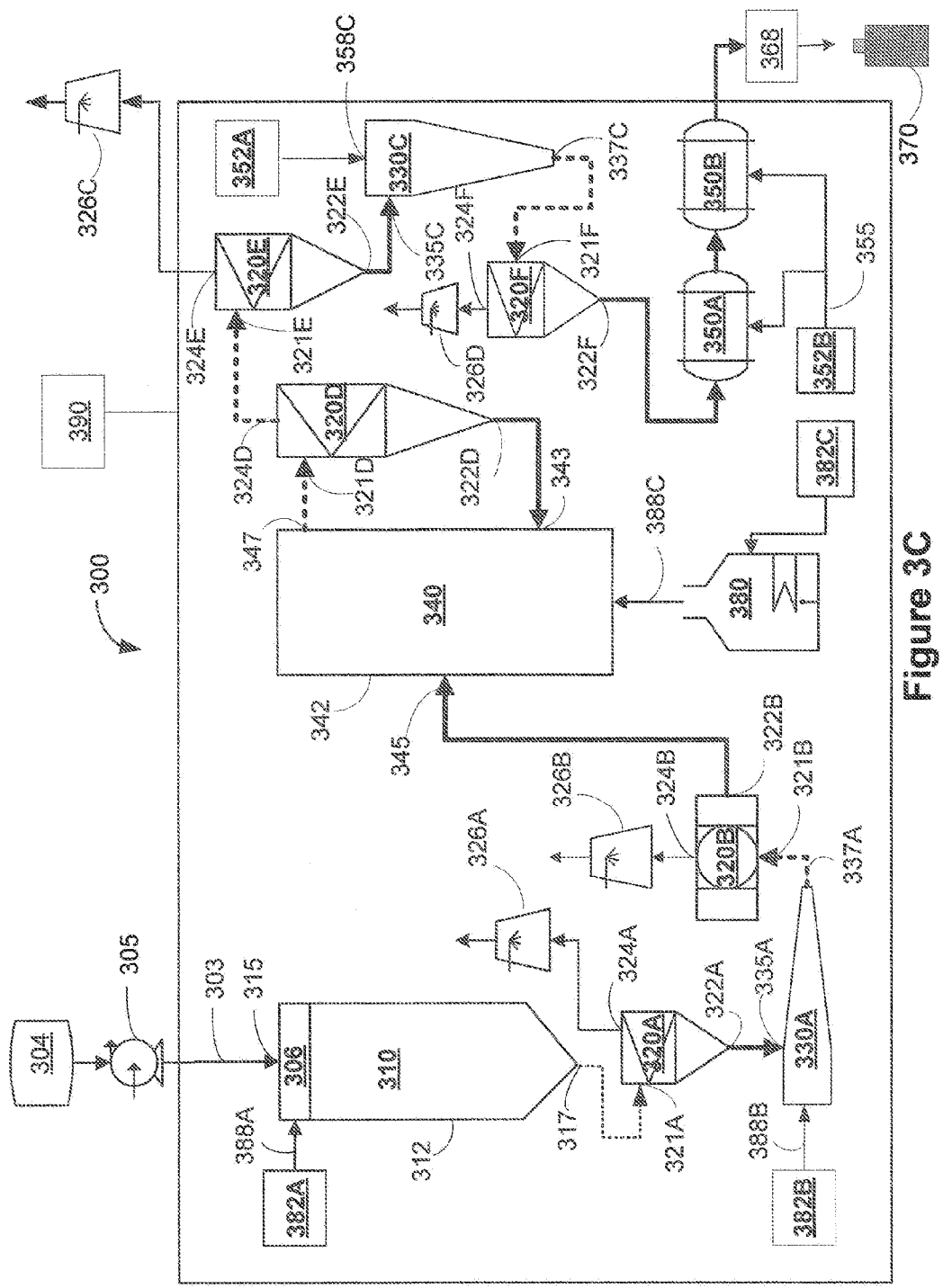
FIG. 3C is a schematic of still another embodiment of a processing system useful in preparing a material for a battery electrochemical cell.
Figure 3D:
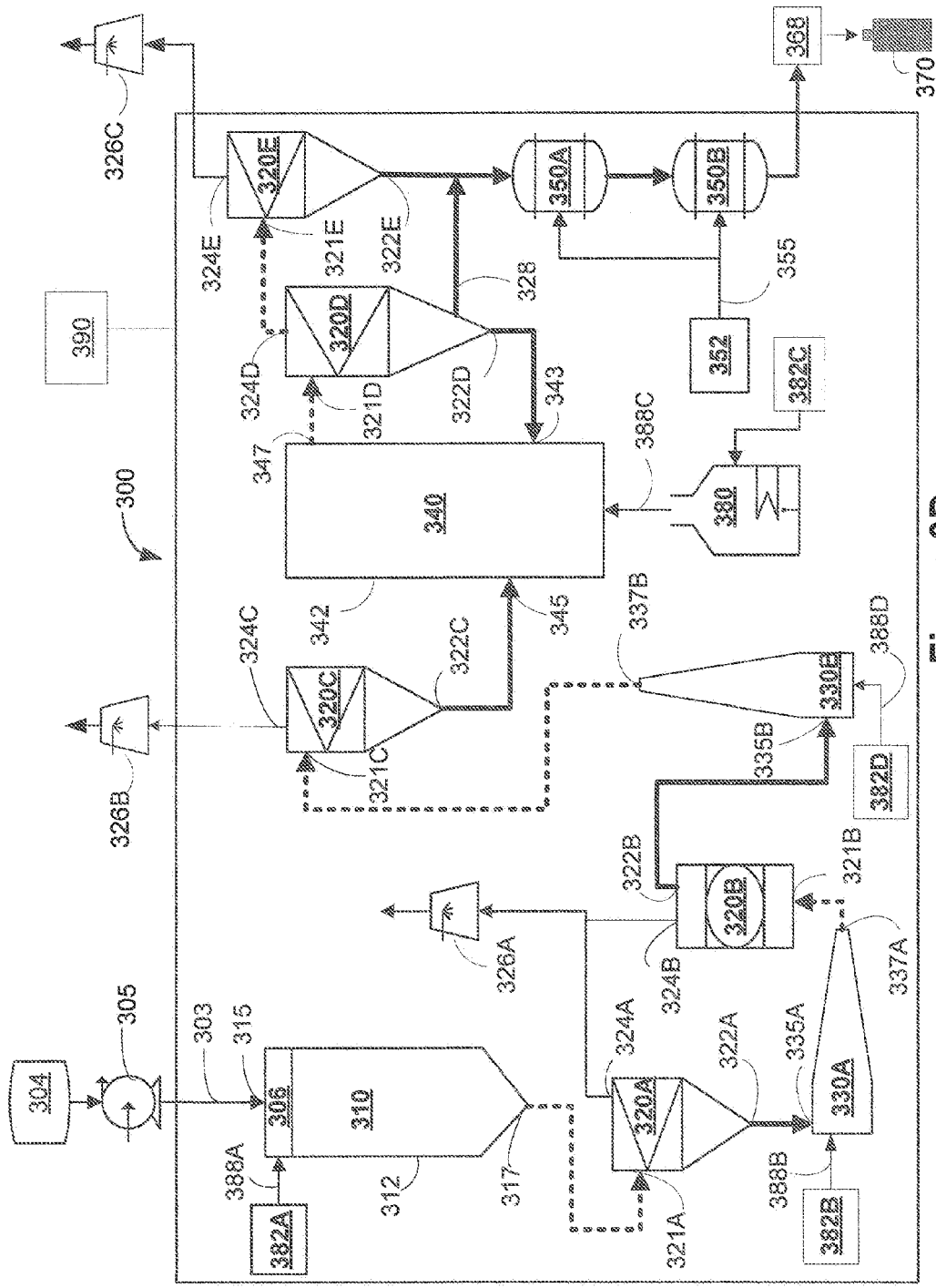
FIG. 3D is a schematic of yet another embodiment of a processing system useful in preparing a material for a battery electrochemical cell.

The separator outlet 322B of the gas-solid separator 320B is adapted to deliver the second type of solid particles to additional in-line processing modules for continuing reactions. For example, the second type of solid particles can be delivered to the reactor 340 of the second processing module as shown in FIGS. 3A-3C or to the second gas-solid feeder 330B of a reaction module as shown in FIG. 3D.

After the solid particles are separated and obtained from the gas-solid separator 320B, they are delivered into the reactor 340 for further reactions. The reactor 340 includes a reactor inlet 345, a gas inlet 388C, and a reactor outlet 347. The reactor inlet 345 is connected to the separator outlet 322B and adapted to receive the solid particles from the gas-solid separator 320B. Optionally, a vessel may be configured to store the second type of solid particles prior to adjusting the amounts of the second type of solid particles delivered into the reactor 340.

The gas inlet 388C of the reactor 340 is coupled to a heating mechanism 380 to heat a gas from a gas source 382C to a reaction temperature of between 400° C. and 1300° C. The heating mechanism 380 can be, for example, an electric heater, a gas-fueled heater, a burner, among other heaters. Additional gas fines can be used to deliver heated air or gas into the reactor 340, if needed. The pre-heated gas can fill the internal plenum of the reactor 340 and maintained the internal temperature of the plenum. The use of heated gas as the energy source inside the reactor 340 provides the benefits of fast heat transfer, precise temperature control obtaining uniform temperature distribution, and/or easy to scale up, among others.

The gas flowed into the reactor 340 is designed to be mixed with solid particles and form a gas-solid mixture inside the reactor 340. Thermal energy from the pre-heated gas is used as the energy source for reacting the gas-solid mixture within the reactor 340 for a residence time of between 1 second and ten hours, or longer, depending on the reaction temperature and the type of the precursors initially delivered into the processing system 300. The chamber body of the reactor 340 is normally designed to withstand high reaction temperature for a long reaction time period. One embodiment of the invention provides the control of the temperature of the reactor 340 by the temperature of the heated gas. The gas-solid mixture is then go through one or more reactions, including, but not limited to, oxidation, reduction, decomposition, combination reaction, phase-transformation, re-crystallization, single displacement reaction, double displacement reaction, combustion, isomerization, and combinations thereof, among others.

Once one or more reactions inside the reactor 340 are complete, for example, upon the formation of desired crystal structure, particle morphology, and particle size, final reaction products are delivered out of the reactor 340 via the reactor outlet 347. The final reaction products can be further processed and cooled down to obtain final solid particles. The cooled solid particles of the reaction products may include, for example, final solid particles of oxidized reaction product of the precursor compounds, suitable to be used as a material of a battery cell.

The reactor 340 is used to convert unreacted or partially reacted precursor particles into reacted material particles or powders. In general, the reactor 340 of the processing system 300 can be a fluidized bed reactor, such as a circulating fluidized bed reactor, a bubbling fluidized bed reactor, an annular fluidized bed reactor, a flash fluidized bed reactor, and combinations thereof. In addition, the reactor 340 can be any of a furnace-type reactor, such as a rotary furnace, a stirring furnace, a furnace with multiple temperature zones, and combinations thereof. FIGS. 6A-6D illustrates examples of reactors 340A, 340B, 340C, 340D which can be used in the processing system 300.

Figures 6A, 6B:
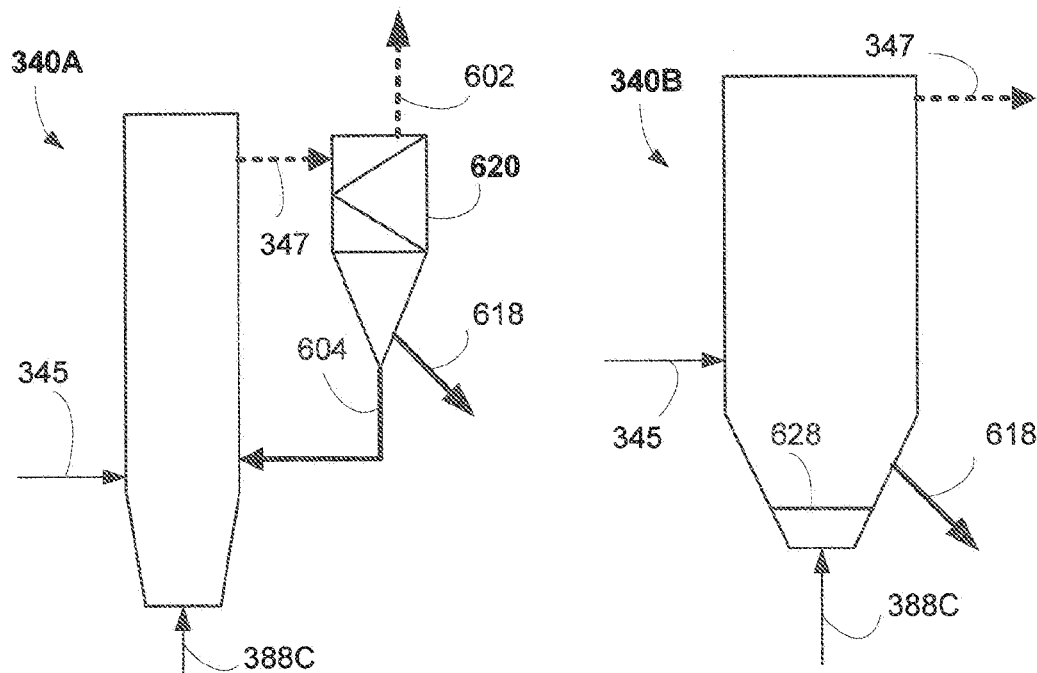
FIG. 6A illustrates one exemplary reactor useful in an in-line processing system to prepare a battery material according one embodiment of the invention.
FIG. 6B illustrates another exemplary reactor useful in an in-line processing system to prepare a battery material according one embodiment of the invention.

In the example of FIG. 6A, the reactor 340A is a circulating-type fluidized bed reactor. The reactor 340A receives solid particles from the reactor inlet 345 and mixes them with a flow of pre-heated gas from the gas line 388C to form a gas-solid mixture within the internal plenum of the reactor 340A. The gas-solid mixture is heated by the thermal energy of the preheated gas and complete reaction is enhanced by continuously flowing the gas-solid mixture out of the reactor 340A into a gas-sold separator 620 coupled to the reactor 340A. The gas-solid separator 620 is provided to remove side products (and/or a portion of reaction products or by-products) out of the reactor 340A of the processing system 300 via a separator outlet 602 and recirculating at least a portion of solid particles back into the reactor 340A via a separator outlet 604. Product particles with desired sizes, crystal structures, and morphology are collected and delivered out of the gas-solid separator 620 via a separator outlet 618 and/or the separator outlet 602.

In the example of FIG. 6B, the reactor 340B is a bubbling-type fluidized bed reactor. A flow of pre-heated gas from the gas line 388C is delivered into the reactor 340B and passes through a porous medium 628 to mix with the solid particles delivered from the reactor inlet 345 and generate a bubbling gaseous fluid-solid mixture within the internal volume of the reactor 340B. The bubbling gas-solid mixture is heated by the thermal energy of the preheated gas and complete reaction is enhanced by bubbling flows within the reactor 340B. Upon complete reaction, gaseous side products are removed out of the reactor 340B via the rector outlet 347. Product particles with desired crystal structures, morphology, and sizes are collected and delivered out of the reactor 340B via the reactor outlet 618.

Figures 6C, 6D:
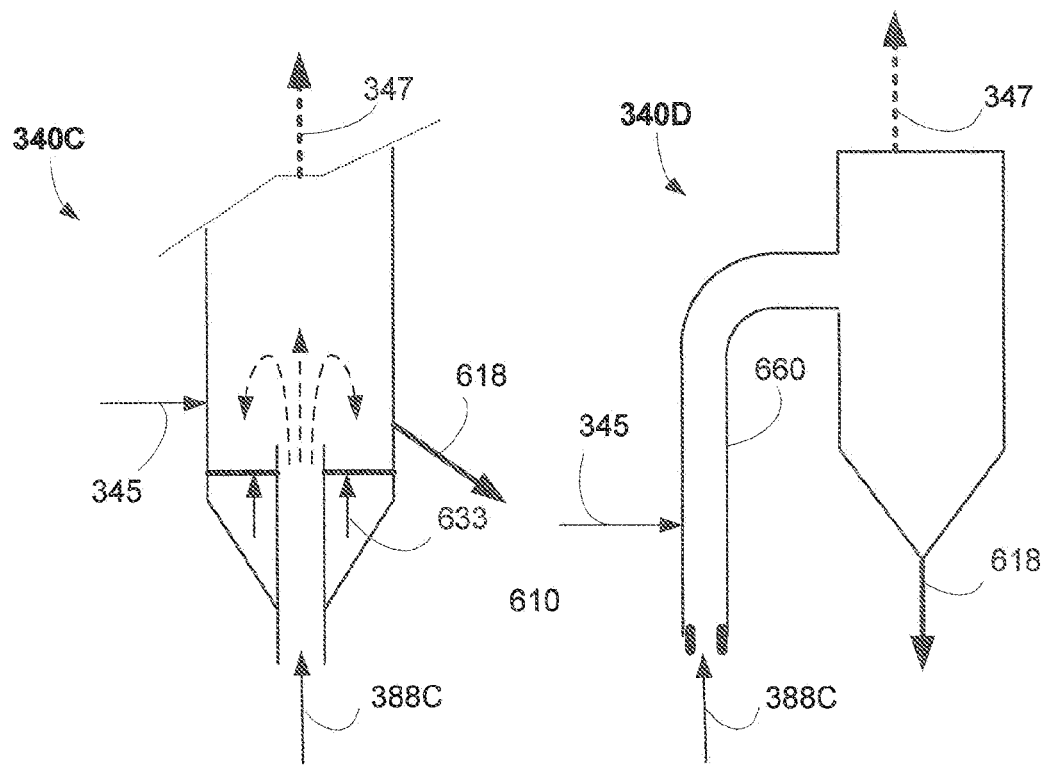
FIG. 6C illustrates still another exemplary reactor useful in an in-line processing system to prepare a battery material according one embodiment of the invention.
FIG. 6D illustrates yet another exemplary reactor useful in an in-line processing system to prepare a battery material according one embodiment of the invention.

In the example of FIG. 6C, the reactor 340C is an annular-type fluidized bed reactor. A flow of pre-heated gas from the gas line 388C is delivered into the reactor 340C and also diverted into additional gas flows, such as gas flows 633, to encourage thorough-mixing of the heated gas with the solid particles delivered from the reactor inlet 345 and generate an uniformly mixed gas-solid mixture within the internal plenum of the reactor 340C. Upon complete reaction, gaseous side products are removed out of the reactor 340C via the rector outlet 347. Product particles with desired crystal structures, morphology, and sizes are collected and delivered out of the reactor 340C via the reactor outlet 618.

In the example of FIG. 6D, the reactor 340D is a flash-type fluidized bed reactor. The reactor 340D receives the solid particles from the reactor inlet 345 and mixes it with a flow of pre-heated gas from the gas line 388C to form a gas-solid mixture. The gas-solid mixture is passed through a tube reactor body 660 which is coupled to the reactor 340D. The gas-solid mixture has to go through the long internal path, which encourages complete mixing and reaction using the thermal energy of the heated gas. Gaseous side products are then removed out of the reactor 340D via the rector outlet 347, and product particles with desired crystal structures, morphology, and sizes are collected and delivered out of the reactor 340D via the reactor outlet 618. It is noted that additional gas lines can be used to deliver heating or cooling air or gas into the reactors 340A, 340B, 340C, 340D.

In some embodiment, the reactor 340 is configured for reacting, a gaseous mixture of solid particles into final reaction products and/or annealing of final reacted product particles into proper crystal structures, particle sizes and morphology. (e.g., by re-circulating reaction products back to the reactor 340). For example, in FIG. 3A, the processing system 300 includes additional gas-solid separator, such as a gas-solid separator 320D, which collects a portion of a gaseous mixture of the reaction products from the reactor outlet 347 of the reactor 340 and separates them into solid particles and gaseous side products. Some of the solid particles may not yet formed properly (e.g., partially reacted particles, agglomerates, undesirable larger sizes, etc.) and need to react longer. In addition, some of the solid particles may need to be further annealed to form into proper crystal structures, sizes, and morphology. Thus, it is contemplated to design a check on the reaction products from the reactor 340 and deliver a portion of the separated and collected solid particles from the gas-solid separator 320D back into the reactor 340 for further reactions (e.g., completing reactions or annealing reaction). Usually, the geometry, together with air flow rate inside a gas-solid separator defines the particle cut point size of the gas-solid separator. For example, a portion of the solid particles separated by the gas-solid separator 320D may contain larger size particles or agglomerates and may be recirculated back into the reactor 340 via a reactor inlet 343. In addition, a portion of the solid particles separated by the gas-solid separator 320D may contain final product particles with desired sizes crystal structures, and morphology, and can be delivered out of the gas-solid separator 320D via a separator outlet 328.

The gas-solid separator 320D may include a separator inlet 321D, a separator outlet 322D and a separator outlet 324D. The separator inlet 3210 is connected to the reactor outlet 347 and adapted to collect the gas-solid mixture and other reactor products from the reactor 340. The gas-solid separator 320D separates the gas-solid mixture from the reactor 340 into solid particles and side products. The separator outlet 322D is adapted to deliver a portion of the separated solid particles back to the reactor 340 for further processing and reactions.

In FIG. 3A, the separator outlet 324D is adapted to deliver gaseous side products out of the gas-solid separator 320D. The side products may be delivered into a gas abatement device 326C to be treated and released out of the processing system 300. The gaseous side products separated by the gas-solid separator 320D may generally contain water ($H_2O$) vapor, organic solvent vapor, nitrogen-containing gas, oxygen-containing gas, $O_2$, $O_3$, nitrogen gas ($N_2$), NO, $NO_2$, $NO_2$, $N_2O$, $N_4O$, $NO_3$, $N_2O_3$, $N_2O_4$, $N_2O_5$, $N(NO_2)_3$, carbon-containing gas, carbon dioxide ($CO_2$), CO, hydrogen-containing gas, $H_2$, chlorine-containing gas, $Cl_2$, sulfur-containing gas. $SO_2$, small particles of the first type of solid particles, small particles of the second type of solid particles, and combinations thereof.

The gas-solid separator 320D may be a particle collector such as cyclone, electrostatic separator, electrostatic precipitator, gravity separator, inertia separator, membrane separator, fluidized beds classifiers electric sieves impactor, leaching separator, elutriator, air classifier, leaching classifier, and combinations thereof. Suitable examples of the gas-solid separator 320D include the gas-solid separators 520A, 520B, 520C, 520D, as shown in FIGS. 5A-5C.

In FIG. 3A, the processing system 300 may further include a cooling module comprised of one or more cooling mechanisms and/or cooling fluid lines connected to the reactor outlet 347 or the separator outlet 328 of the gas solid separator 320D and adapted to deliver one or more cooling fluids to cool solid particles and final reaction products from the reactor 340. In FIG. 3A, the cooling module may include a heat exchanger 350 and a cooling fluid source 352. For example, a cooling fluid line 355 may be connected to the heat exchanger 350 and adapted to deliver a cooling fluid from the cooling fluid source 352 to an inlet of the heat exchanger 350.

The cooling fluid may be a liquid and/or a gas and may be filtered by a filter to remove particles prior to being delivered into the heat exchanger 350. The heat exchanger 350 is adapted to collect the solid particles and/or final reaction products from the reactor 340 directly and/or via the gas-solid separator 320D and cool the solid particles by delivering a cooling fluid through them. The cooling fluid may have a temperature (e.g., between 4° C. and 30° C.), which is lower than the temperature of the reaction products and the solid particles delivered from the gas-solid separator 320D and/or the reactor 340. The cooling fluid may be water, liquid nitrogen, an air, an inert gas or any liquids or gases which would not react to the reaction products (e.g., final reacted solid particles). Once being cooled, the solid particles are delivered out of the processing system 300 and collected in a final product collector 368. The solid particles may include oxidized form of precursors, such as an oxide material, suitable to be packed into a battery cell 370.

In the example of FIG. 3B, the processing system 300 generally includes a first drying module, two reactions modules, and two cooling modules. The reactor 340 within the processing system 300 may be coupled to two or more gas-solid separators, 320D, 320E. The two cooling modules are comprised of two heat exchangers 350A, 350B, respectively. Solid particles from the first drying module and the first reaction module are delivered in-line to the reactor 340 of the second reaction module to form gas-solid mixtures and react for a residence time at a high reaction temperature of between 600° C. and 1300° C. into a gaseous mixture of reaction products.

In FIG. 3B, a portion of the gaseous mixture of reaction products (which be partially reacted and/or completely reacted) are then delivered out of the reactor 340 (via reactor outlet 347) into the gas-solid separator 320D (via the separator inlet 321D) to be separated into solid particles, for example, partially reacted particles, agglomerates, large particles, and other products. A portion of the separated solid particles are delivered back into the reactor 340 for further reactions (e.g., completing reactions and/or annealing reaction). On the other hand, a portion of a gaseous mixture including water ($H_2O$) vapor, gaseous reaction product mixture, small particles of the reacted solid particles, and/or other reaction products and by-products, etc., which was initially obtained from the reactor 340 are delivered from the separator outlet 324D of the gas-solid separator 320D into a separator inlet 321E of the gas-solid separator 320E to further separate and obtain final reacted solid particles.

The gas-solid separator 320E collects a portion of a gaseous mixture from the reactor 340 via the gas-solid separator 320D and separates the gaseous mixture into final reacted solid particles and other gaseous side products, by-products or vapors. The final reacted solid particles are obtained from a separator outlet 322E of the gas-solid separator 320E. The gaseous side products separated by the gas-solid separator 320E are delivered into the gas abatement device 326C via a separator outlet 324E of the gas-solid separator 320E and exited the processing system 300. In addition, some of the solid particles, which are separated by the gas-solid separator 320D and obtained from the separator outlet 328, are mixed with the final reacted solid particles obtained from the separator outlet 322E of the gas-solid separator 320E.

Once all of the final reacted solid particles are obtained, they are delivered to the heat exchanger 350A of the first cooling module and in-line to the heat exchanger 350B of the second cooling module to cool their temperatures. The two heat exchangers 350A, 350B are configured in tandem and positioned in-line to facilitate faster cooling of final solid particles without interfering with system throughput. Once the final solid particles are cooled, they are collected in the final product collector 368 and delivered out of the processing system 300, to be packed into the battery cell 370.

In the example of FIG. 3C, the processing system 300 may include a first drying module and two reactions modules, having the reactor 340 coupled to two or more gas-solid separators, 320D, 320E. Further, the processing system 300 may include three or more cooling modules, where a first cooling module is comprised of a gas-solid feeder 330C and a gas-solid separator 320F, a second cooling module is comprised of the heat exchangers 350A, and a third cooling module is comprised of the heat exchanger 350B.

In FIG. 3 the first cooling module is configured to direct a flow of a cooling fluid from a cooling fluid source 352A to the final reacted solid particles obtained from the reaction module and mixed them together to facilitate cooling efficiency. For example, the gas-solid feeder 330C may include a solid inlet 335C connected to the separator outlet 322E and adapted to receive the final reacted solid particles, a gas inlet 358C, and a gas-solid outlet 337C. Optionally, one or more vessels can be configured to store the final reacted solid particles prior to adjusting the amounts of the final reacted solid particles delivered into the gas-solid feeder 330C. The gas-solid feeder 330C may be, for example, a venturi feeder, a rotary feeder, a screw feeder, a table feeder, a belt feeder, a vibrating feeder, a tube feeder, and combinations thereof, among others.

The gas inlet 358C of the gas-solid feeder 330C, is connected to the cooling fluid source 352A to deliver a flow of a cooling fluid having a temperature of between 4° C. and 30° C. The cooling fluid may be an inert gas or any other gases which would not react to the reaction products (e.g., final reacted solid particles). The cooling fluid may be filtered by a filter to remove particles prior to being delivered into the gas-solid feeder 330C. The cooling gas is injected into the gas-solid feeder 330C at an adjustable flow rate to fill the internal plenum of the gas-solid feeder 330C, mix with the final reacted solid particles, and form a cooled gas-solid mixture. The cooled gas-solid mixture is delivered, through the plenum of the gas-solid feeder 330C and into the gas-solid separator 320F, for a cooling residence time of between 1 second and 1 hour.

As shown in FIG. 3C, the gas-solid separator 320F of the first cooling module includes a separator inlet 321F to receive the cooled gas-solid mixture, a separator outlet 322F and a separator outlet 324F. The gas-solid separator 320F separates the cooled gas-solid mixture into cooled final reacted solid particles and a gaseous side product. The gaseous side product may include water vapors and/or other by-products and is delivered via the separator outlet 324F into a gas abatement device 326D to exit the processing system 300. The cooled final reacted solid particles can be delivered to the second cooling module to further cool its temperature, and/or to the final product collector 368.

The heat exchangers 350A, 350B of the second and third cooling modules are connected to the same or different cooling fluid sources. For example the heat exchangers 350A, 350B may be connected via the cooling fluid line 355 to a cooling fluid source 352B. The heat exchangers 350A, 350B collect the cooled reacted solid particles and/or final reaction products delivered from the gas-solid feeder 330C, and exchange thermal energy with a cooling fluid flowed from the cooling fluid source 352B. Next, the solid particles cooled by the heat exchangers 350A, 350B are delivered into the final product collector 368. In one example, the solid particles include oxidized form of precursors, such as an oxide material, suitable to be packed into the battery cell 370.

In the example of FIG. 3D, the processing system 300 may include a first drying module, three or more reactions modules, and two or more cooling module. The three reaction modules may include a first reaction module comprised of the first gas-solid feeder 330A and the gas solid separator 320B, a second reaction module comprised of the second gas-solid feeder 330B and the gas solid separator 320C, and a third reaction module comprised of the reactor 340, and one or more gas solid separators (e.g., the solid-separators 320D, 320E, etc.) The two cooling modules include a first cooling module comprised of the heat exchanger 350A and a second cooling module comprised of the heat exchanger 350B.

The gas-solid feeder 330B includes a solid inlet 335B, a gas inlet 388D connected to a gas source 382D, and a gas-solid outlet 337B. The gas-solid feeder 330A is connected to the separator outlet 322A and adapted to receive the solid particles from the gas-solid separator 320B of the first reaction module. Optionally, one or more vessel can be configured to store the solid particles prior to adjusting the amounts of the solid particles delivered into the gas-solid feeder 330B.

In FIG. 3D, the gas-solid feeder 330B of the second reaction module is configured to mix a gas received from the gas source 382D with the solid particles received from the gas-solid separator 320B to form a gas-solid mixture therein and delivered into the gas-solid separator 320C. The gas-solid feeder 330B can be any suitable gas-solid feeders, such as a venturi feeder, a rotary feeder, a screw feeder, a table feeder, a belt feeder, a vibrating feeder, a tube feeder, and combinations thereof, among others. It is contemplated to couple the gas inlet 388D of the gas-solid feeder 330B to a heating mechanism to heat a gas from the gas source 382D to a reaction temperature of between 400° C. and 1300° C. for further reacting the solid particles obtain from the first reaction module prior to delivering them into the reactor 340 of the third reaction module for complete reactions. The heating mechanism coupled to the gas inlet 388D can be, for example, an electric heater, a gas-fueled heater, a burner, among other heaters. Additional gas lines can be used to deliver heated air or gas into the gas-solid feeder 330B, if needed. The preheated gas is injected into the gas-solid feeder 330B at an adjustable flow rate to fill the internal plenum of the gas-solid feeder 330B and mix with the solid particles to form a third gas-solid mixture. The internal plenum of the gas-solid feeder 330A can be maintained at an internal temperature, using the thermal energy of the gas injected within the gas-solid feeder 330B. One or more reactions of the solid particles obtained from the first reaction module can be continued within the gas-solid feeder 330B of the second reaction module, for a residence time of between 1 second and ten hours, or longer, between the time the gas-solid mixture are formed within the gas-solid feeder 330B, and the time the gas-solid mixture is separated by the gas-solid separator 320C within the second reaction module.

The gas-solid separator 320C includes a separator inlet 321C, a separator outlet 322C, and a separator outlet 324C. The separator inlet 321C is connected to the gas-solid outlet 337B of the gas-solid feeder 330B. The gas-solid separator 320C separates the gas-solid mixture delivered from the gas-solid feeder 330B into solid particles and a gaseous side product. The separator outlet 322C is connected to the reactor inlet 345 of the reactor 340 for delivering separated solid particles into the reactor 340. The separator outlet 324C is connected to the gas abatement device 326B for delivering gaseous side product out of the processing system 300. The gas-solid separator 320C may be any of the gas-solid separators 520A, 520B, 520C, 520D, as shown in FIGS. 5A-5C, according various embodiments of the invention.

In FIG. 3D, solid particles containing one or more precursors obtained from the first drying module are delivered in-line to the first reaction module and the second reaction module to initiate and continue one or reactions of the precursors, which are further processed in-line by the reactor 340 of the third reaction module. Within the three reaction modules, the solid particles are continuously processed (e.g., being mixed with one or more gases into gas-solid mixtures and then separated into solid particles) to carry out one or more thermal reactions to the precursor-containing particles. The reactions within the three reaction modules include, but are not limited to, oxidation, reduction, decomposition, phase-transformation, combination reaction, phase-transformation, re-crystallization, annealing, single displacement reaction, double displacement reaction, combustion, isomerization, and combinations thereof. Once all of the final reacted solid particles are obtained, they are cooled by the heat exchangers 350A, 350B and collected in the final product collector 368.

As shown in FIGS. 3A-3D, a process control system 390 can be coupled to the processing system 300 at various locations to automatically control the manufacturing process performed by the processing system 300 and adjust various process parameters (e.g., flow rate, mixture ratio, temperature, residence time, etc.) within the processing system 300. For example, the flow rate of the liquid mixture into the processing system 300 can be adjusted near the liquid mixture container 304 or the pump 305. As another example, the droplet size and generation rate of the mist generated by the mist generator 306 can be adjusted. In addition, flow rate and temperatures of various gases flowed within the gas lines 388A, 388B, 388C, 388C, 355, 515, etc., can be controlled by the process control system 390. In addition, the process control system 390 is adapted to control the temperature, air pressure, and the residence time of various gas-solid mixture and solid particles at desired level at, various locations.

In operation, the process control system 390 may be used to control the parameters of a continuous multi-stage process (e.g., the method 100 as described herein) performed within the processing system 300 to obtain high quality and consistent active battery materials with much less time, labor, and supervision than materials prepared from conventional manufacturing processes. Representative processing profiles performed by the processing system 300 of FIGS. 3A-3D are shown as temperature-versus-time plots in FIGS. 4A-4D, respectively. The multi-stage process may include a first processing stage 411, a second processing stage 412, a third processing stage 413, and a fourth processing stage 414.

Figure 4A:
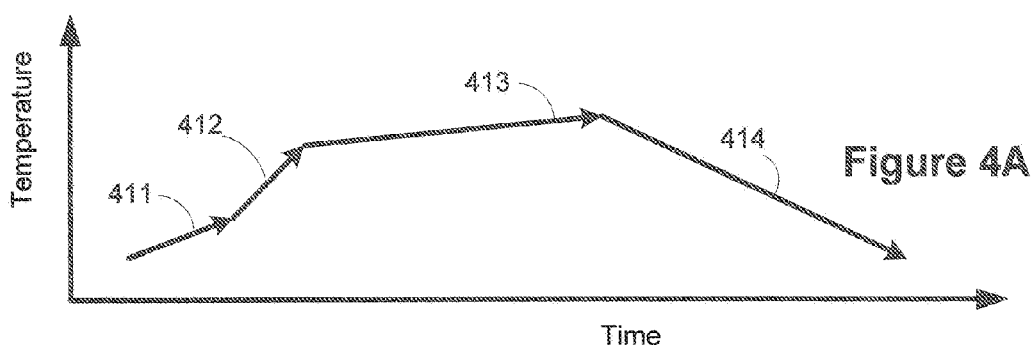
FIG. 4A illustrates one example of a temperature-versus-time profile of a multi-stage process using the processing system of FIG. 3A to prepare a battery material according to one embodiment of the invention.

In FIG. 4A, the process profile performed by the first drying module of the processing system 300 of FIG. 3A is indicated as the first processing stage 411. The second processing stage 412 represents the process profile performed by the first reaction module, and the third processing stage 413 presented the process profile performed by the second reaction module. Further, the process profile performed by the cooling module is presented as the fourth processing stage 414.

Figure 4B:
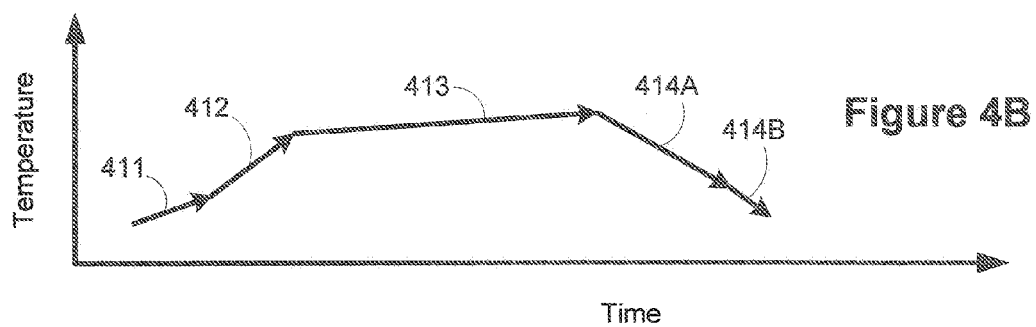
FIG. 4B illustrates another example of a temperature-versus-time profile of a multi-stage process using the processing system of FIG. 3B to prepare a battery material according to one embodiment of the invention.

In FIG. 4B, the process profiles performed by the first drying module, the first reaction module, and the second reaction module of the processing system 300 of FIG. 3B are shown as the first processing stage 411, the second processing stage 412, and the third processing stage 413. In addition, the process profiles performed by the heat exchangers 350A, 350B of the first and the second cooling modules are presented as processing stages 414A, 414B, respectively. Comparing the process profiles of FIGS. 4A-4B, shorter process time can be accomplished by installing additional in-line gas-solid separator and heat exchanger.

Figure 4C:
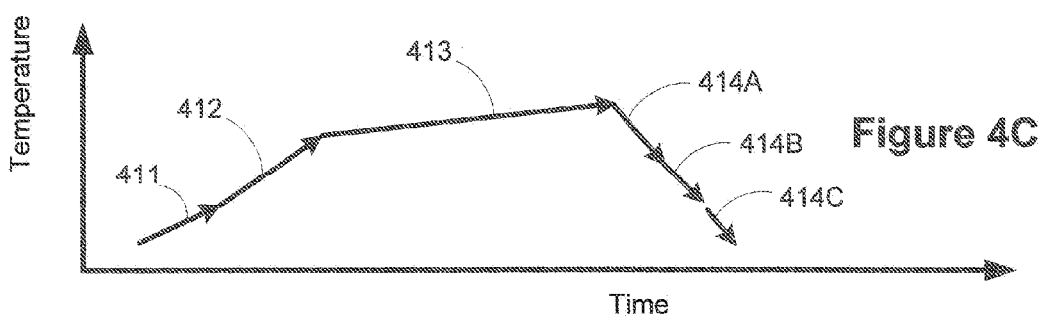
FIG. 4C illustrates another example of a temperature-versus-time profile of a multi-stage process using the processing system of FIG. 3C to prepare a battery material according to one embodiment of the invention.

In FIG. 4C, the process profiles performed by the first drying, module, the first reaction module, and the second reaction module of the processing system 300 of FIG. 3C are shown as the first processing stage 411, the second processing stage 412, and the third processing stage 413. In addition, the process profiles performed by the first, second and third cooling modules are presented as processing stages 414A, 414B, and 414C, respectively. Comparing the process profiles of FIGS. 4A-4C shorter process time can be accomplished by configuring additional in-line cooling modules having multiple gas-solid feeders and/or heat exchangers.

Figure 4D:
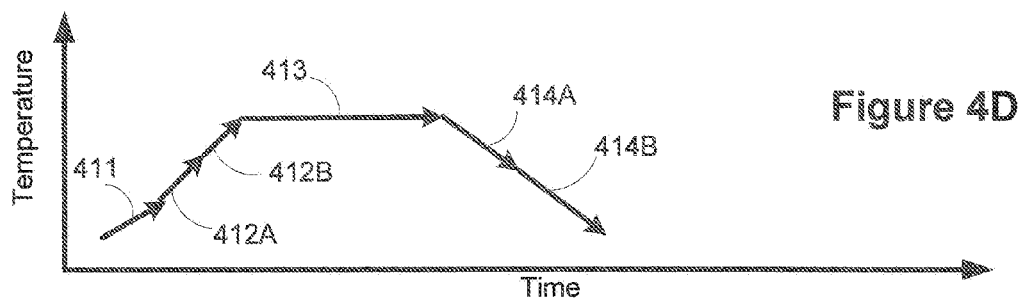
FIG. 4D illustrates another example of a temperature-versus-time profile of multi-stage process using the processing system of FIG. 3D to prepare a battery material according to one embodiment of the invention.

In FIG. 4D, the process profiles performed by the first drying module and the three reaction modules of the processing system 300 of FIG. 3C are shown as the first processing stage 411, the second processing stages 412A, 412B, and the third processing stage 413, respectively. In addition, the process profiles performed by the two cooling modules, are presented as processing stages 414A and 414B, respectively. As shown in FIG. 4D, shorter reaction processing time can be accomplished by installing additional in-line reaction modules having multiple gas-solid feeders to initiate reactions.

Accordingly, a continuous multi-stage process for producing a material of a battery cell using a processing system having a mist generator, a drying chamber, one or more gas-solid separators, one or more gas-solid feeders, a reactor, and, optionally, one or more cooling mechanisms is provided. A mist generated from liquid mixture of one or more precursor compounds (e.g., at least one metal-containing compound and at least one solvent in desired ratio) is mixed with air to form gas-solid mixtures and dried inside the drying chamber. One or more gas-solid separators are used in the processing system to separate gas-solid mixtures (formed and delivered from the drying chamber, the gas-solid feeders, and the reactor, etc.) into solid particles and continuously deliver the solid particles into the next-stage processing modules for further material processing, thereby obtaining final solid material particles suitable to be fabricated inside a battery cell.

In one embodiment, preparation and manufacturing of a metal oxide material is provided. Depending on the details and ratios of the metal-containing precursor compounds that are delivered into the processing system 300, the resulting final solid material particles obtained from the processing system 300 may contain desired ratio of metals intercalated into proper crystal structure and morphology. For example, the final solid particles or powders from the processing system 300 may contain a metal oxide material, a doped metal oxide material, an inorganic metal salts, among others. Exemplary metal oxide materials include, but are not limited to, titanium oxide ($Ti_xO_y$, such as $Ti_2O_5$), chromium oxide ($Cr_xO_y$, such as $Cr_2O_7$), tin oxide ($Sn_xO_y$, such as $SnO_2$, $SnO$, $SnSiO_3$, etc.), copper oxide ($Cr_xO_y$, such as $CuO$, $Cu_2O$, etc.), aluminum oxide ($Al_xO_y$, such as $Al_2O_3$), manganese oxide ($Mn_xO_y$), iron oxide ($Fe_xO_y$, such as $Fe_2O_3$, etc), among others.

For mixed metal oxide materials, it is desired to control the composition of final reaction product material powders or particles by the ratio of the precursor compounds added in a liquid mixture added to the processing system 300. In one embodiment, a metal oxide with two or more metals ($Me_xMe'_yO$) is obtained. Examples include lithium transitional metal oxide ($LiMeO_2$), lithium titanium oxide (e.g., $Li_4Ti_5O_{12}$), lithium cobalt oxide (e.g., $LiCoO_2$), lithium manganese oxide (e.g., $LiMn_2O_4$), lithium nickel oxide (e.g., $LiNiO_2$), lithium iron phosphate (e.g., $LiFePO_4$), lithium cobalt phosphate (e.g., $LiCoPO_4$), lithium manganese phosphate (e.g., $LiMnPO_4$), lithium nickel phosphate (e.g., $LiNiPO_4$), sodium iron oxide (e.g., $NaFe_2O_3$), sodium iron phosphate (e.g., $NaFeP_2O_7$), among others.

In another example, a metal oxide with three or four intercalated metals is obtained. Exemplary metal oxide materials include, but are not limited to, lithium nickel cobalt oxide (e.g., $Li_xNi_yCo_zO_2$), lithium nickel manganese oxide (e.g., $Li_xNi_yMn_zO_2$, $Li_xNi_yMn_zO_4$, etc.), lithium nickel manganese cobalt oxide (e.g., $Li_aNi_bMn_cCo_dO_e$ in layered structures or layered-layered structures; and/or $LiNi_xMn_yCo_zO_2$, a NMC oxide material where x+y+z=1, such as $LiNi_{0.33}Mn_{0.33}Co_{0.33}O_2$, $LiNi_{0.6}Mn_{0.2}Co_{0.2}O_2$, $LiNi_{0.5}Mn_{0.3}Co_{0.2}O_2$, $LiNi_{0.5}Mn_{0.3}Co_{0.2}O_2$, $LiNi_{0.4}Mn_{0.4}Co_{0.2}O_2$, $LiNi_{0.7}Mn_{0.15}Co_{0.15}O_2$, $LiNi_{0.8}Mn_{0.1}Co_{0.1}O_2$, etc; and/or a mixed metal oxide with doped metal, among others. Other examples include lithium cobalt aluminum oxide (e.g., $Li_xCo_yAl_zO_n$), lithium nickel cobalt aluminum oxide (e.g., $Li_xNi_yCo_zAl_aO_b$), sodium iron manganese oxide (e.g., $Na_xFe_yMn_zO_2$), among others. In another example, a mixed metal oxide with doped metal is obtained; for example, $Li_a(Ni_xMn_yCo_z)MeO_b$ (where Me=doped metal of Al, Mg, Fe, Ti, Cr, Zr, or C), $Li_a(Ni_xMn_yCo_z)MeO_bF_c$ (where Me=doped metal of Al, Mg, Fe, Ti, Cr, Zr, or C), among others.

Other metal oxide materials containing one or more lithium (Li), nickel (Ni), manganese (Mn), cobalt (Co), aluminum (Al), titanium (Ti), sodium (Na), potassium (K), rubidium (Rb), vanadium (V), cesium (Cs), copper (Cu), magnesium (Mg), iron (Fe), among others, can also be obtained. In addition, the metal oxide materials can exhibit a crystal structure of metals in the shape of layered, spinel, olivine, etc. In addition, the morphology of the final reaction particles (such as, the second type of solid particles prepared using the method 100 and the processing system 300 as described herein) exists as desired solid powders. The particle sizes of the solid powders range between 10 nm and 100 um.

While the foregoing is directed to embodiments of the present invention, other and further embodiments of the invention may be devised without departing from the basic scope thereof, and the scope thereof is determined by the claims that follow.

What is claimed:

1. A system of producing a material for a battery cell, comprising:
   a drying chamber connected to a first gas line and adapted to flow a first gas inside the drying chamber;
   a first gas-solid separator connected to the dying chamber, wherein the first gas-solid separator receives a chamber-product from the dying chamber and separates the chamber-product into a first type of solid particles and a first side product;
   one or more gas-solid feeders connected to the first gas-solid separator and one or more second gas lines, wherein the one or more gas-solid feeders receive the first type of solid particles from the first gas-solid separator, mix a second gas with the first type of solid particles, and form one or more gas-solid mixtures therein;
   one or more second gas-solid separators connected to the one or more gas-solid feeders, wherein the one or more second gas-solid separators separate the one or more gas-solid mixtures into one or more types of solid particles and one or more side products; and
   a reactor connected to the one or more second gas-solid separators and a third gas line having a third gas flowed therein, wherein the reactor receives the one or more types of solid particles from the one or more second gas-solid separators and mixes the one or more types of solid particles with the third gas into a reaction mixture, wherein a final reaction product is obtained from a reaction of the reaction mixture within the reactor.

2. The system of claim 1, further comprising:
   a mist generator connected to the drying chamber and adapted to generate a mist from a liquid mixture of one or more precursors.

3. The system of claim 2, wherein a flow of the first gas is flown into the drying chamber such that the flow of the first gas and the flow of the mist are flowed as co-currents.

4. The system of claim 2, wherein a flow of the first gas is flowed into the drying chamber such that the flow of the first gas and the flow of the mist are flown as counter-currents.

5. The system of claim 1, wherein each of the first gas-solid separator and the one or more second gas-solid separators is selected from the group consisting of cyclones, electrostatic separators, electrostatic precipitators, gravity separators, inertia separators, membrane separators, fluidized beds, classifiers, electric sieves, impactors, particles collectors, leaching separators, elutriators, air classifiers, leaching classifiers, and combination thereof.

6. The system of claim 1, wherein the first gas comprises a gas selected from the group consisting of air, oxygen, carbon dioxide, an oxidizing gas, a reducing gas, nitrogen gas, hydrogen gas, inert gas, noble gas, and combinations thereof, and the first gas is heated to a temperature of between 70° C. and 600° C.

7. The system of claim 1, wherein each of the second gas and the third gas comprises a gas selected from the group consisting of air, oxygen, carbon dioxide, an oxidizing gas, a reducing gas, nitrogen gas, hydrogen gas, inert gas, noble gas, and combinations thereof, and the second gas is heated to a first reaction temperature of between 400° C. and 1300° C. and the third gas is heated to a second reaction temperature of between 400° C. and 1300° C., wherein the third reaction temperature is higher than the second reaction temperature.

8. The system of claim 1, wherein each of the one or more gas-solid feeders is selected from the group consisting of a venturi feeder, a rotary feeder, a screw feeder, a table feeder, a belt feeder, a vibrating feeder, a tube feeder, and combinations thereof.

9. The system of claim 1, wherein the reactor is selected from the group consisting of a fluidized bed reactor, a circulating fluidized bed reactor, a bubbling fluidized bed reactor, an annular fluidized bed reactor, a flash fluidized bed reactor, and combinations thereof.

10. The system of claim 1, wherein the reactor is selected from the group consisting of a furnace, a rotary furnace, a stirring furnace, a furnace with multiple temperature zones, and combinations thereof.

11. The system of claim 1, wherein the reaction within the reactor is selected from the group consisting of oxidization, reduction, decomposition, combination reaction, phase-transformation, re-crystallization, single displacement reaction, double displacement reaction, combustion, isomerization, annealing, and combinations thereof.

12. The system of claim 1, further comprising:
   one or more cooling mechanisms adapted to cool the final reaction product.

13. The system of claim 12, wherein each of the one or more cooling mechanisms is selected from the group consisting of a gas-solid separator, a heat exchanger a gas-solid feeder, a fluidized bed, and combinations thereof.

14. The system of claim 1, further comprising:
   one or more third gas-solid separators connected to the reactor and adapted to separate the reaction mixture into the final reaction product and a reaction-side product.

15. The system of claim 1, further comprising:
   one or more gas-solid feeders adapted to mix one or more cooling fluid with the final reaction product and cool the final reaction product.

16. A system of producing a material for a battery cell, comprising:
   a dying chamber connected to a first gas line and adapted to flow a first gas inside the dying chamber;
   a first gas-solid separator connected to the drying chamber, wherein the first gas-solid separator receives a chamber-product from the drying chamber and separates the one or more drying chamber products into a first type of solid particles and a first side product;

one or more gas-solid feeders connected to the first gas-solid separator and one or more second gas lines, wherein the one or more gas-solid feeders receive the first type of solid particles from the first gas-solid separator, mix a second gas with the first type of solid particles, and form one or more gas-solid mixtures therein;

one or more second gas-solid separators connected to the one or more gas-solid feeders, wherein the one or more second gas-solid separators separate the one or more gas-solid mixtures into one or more second types d solid particles and one or more second side products; and a fluidized bed reactor connected to the one or more second gas-solid separators and a third gas fine having a third gas flowed therein, wherein the fluidized bed reactor receives the one or more second types of solid particles from the one or more second gas-solid separators and mixes the one or more second types of solid particles with the third gas into a reaction mixture, wherein a final reaction product is obtained from a reaction of the reaction mixture within the fluidized bed reactor.

17. The system of claim 16, wherein the fluidized bed reactor is selected from the group consisting of a circulating fluidized bed reactor, a bubbling fluidized bed reactor, an annular fluidized bed reactor, a flash fluidized bed reactor, and combinations thereof.

18. The system of claim 16, further comprising:
a third gas-solid separator connected to the fluidized bed reactor and adapted to separate a portion of the reaction mixture delivered from the fluidized bed reactor into a third type of solid particles, wherein a portion of the third type of solid particles are delivered back into the fluidized bed reactor for further reaction; and
one or more fourth gas-solid separators connected to the third gas-solid separator and adapted to separate the reaction mixture into the final reaction product and a reaction-side product.

19. The system of claim 16, further comprising:
one or more cooling mechanisms selected from the group consisting of a gas-solid separator, a heat exchanger, a gas solid feeder, a fluidized bed, and combinations thereof, wherein the one or more cooling mechanisms are adapted to cool the final reaction product.

20. A system of producing a material for a battery cell, comprising:
a drying chamber, comprising:
a chamber inlet; and
a gas inlet connected to first gas line and adapted to flow a first gas inside the drying chamber;
a first gas-solid separator connected to the drying chamber, wherein the first gas-solid separator receives a chamber product from the drying chamber and separates the one or more drying chamber products into a first type of solid particles and a first side product;
a first gas-solid feeder, comprising:
a feeder inlet connected to the first gas-solid separator and adapted to receive the first type of solid particles from the first gas-solid separator; and
a feeder gas inlet connected to a second gas line and adapted to flow a second gas to be mixed with the first type of solid particles and form a second gas-solid mixture therein;
a second gas-solid separator connected to the first gas-solid feeder, wherein the second gas-solid separator separates the one or more gas-solid mixtures into a second type of solid particles and a second side product; and
a reactor, comprising:
a reactor inlet connected to the second gas-solid separator and adapted to receive the second type of solid particles from the second gas-solid separator;
a reactor gas inlet connected to a third gas line and adapted to flow a third as to be mixed with the second type of solid particles into a reaction mixture, wherein a final reaction product is obtained from a reaction of the reaction mixture within the reactor.

21. The system of claim 20, further comprising:
a third gas-solid separator connected to the reactor and adapted to separate a portion of the reaction mixture delivered from the reactor into a third type of solid particles and deliver a portion of the third type of solid particles back into the reactor for further reaction.

22. The system of claim 20, further comprising:
one or more fourth gas-solid separators adapted to separate the reaction mixture into the final reaction product and a reaction-side product.

23. The system of claim 20, further comprising:
one or more cooling mechanisms adapted to coot the final reaction product.

* * * * *